United States Patent [19]

Anderson et al.

[11] Patent Number: 5,235,654

[45] Date of Patent: Aug. 10, 1993

[54] ADVANCED DATA CAPTURE ARCHITECTURE DATA PROCESSING SYSTEM AND METHOD FOR SCANNED IMAGES OF DOCUMENT FORMS

[75] Inventors: Gerald B. Anderson, Scarborough, Canada; James H. Bamford, Gaithersburg, Md.; Timothy S. Betts, Germantown, Md.; Valerie M. Carras, Kensington, Md.; Michael C. Concagh, Damascus, Md.; Michael E. Daley, Rockville, Md.; James M. Hawkins, Fleetwood, N.Y.; Peter M. Jakab, Mississauga, Canada; Lewis B. Knecht, Olney, Md.; Fredric W. Kratochvil, Ijamsville, Md.; Sin-Ya Liu, Rockville, Md.; Thomas L. Paulson, Potomac, Md.; Doraiswamy Rajagopal, Gaithersburg, Md.; Manoj K. Tiwari, Germantown, Md.

[73] Assignee: International Business Machines Corporation, Armonk, N.Y.

[21] Appl. No.: 876,279

[22] Filed: Apr. 30, 1992

[51] Int. Cl.$^5$ .............................................. G06K 9/20
[52] U.S. Cl. .................................... 382/61; 395/149
[58] Field of Search .................. 395/148, 149; 382/61

[56] References Cited

U.S. PATENT DOCUMENTS

| | | | |
|---|---|---|---|
| 4,503,556 | 3/1985 | Scherl et al. | 382/9 |
| 4,533,959 | 8/1985 | Sakurai | 358/280 |
| 4,553,261 | 11/1985 | Froessl | 382/61 |
| 4,616,854 | 10/1986 | Landrum et al. | 283/74 |
| 4,741,045 | 4/1988 | Denning | 382/9 |
| 4,748,678 | 5/1988 | Takeda et al. | 382/56 |
| 4,813,077 | 3/1989 | Woods et al. | 382/7 |
| 4,933,979 | 6/1990 | Suzuki et al. | 382/61 |
| 4,933,984 | 6/1990 | Nakano et al. | 382/61 |
| 4,949,287 | 8/1990 | Yamaguchi et al. | 395/148 |
| 4,949,392 | 8/1990 | Barski et al. | 382/61 |
| 5,010,580 | 4/1991 | Vincent et al. | 382/17 |

OTHER PUBLICATIONS

R. G. Casey, et al. entitled "Intelligent Forms Processing," *IBM Systems Journal*, vol. 29, No. 3, 1990, pp. 435–450.

Primary Examiner—Leo H. Boudreau
Assistant Examiner—Jon Chang
Attorney, Agent, or Firm—John E. Hoel

[57] ABSTRACT

An advanced data capture architecture is disclosed which enables the free-definition and re-definition of the format of document forms without requiring any reprogramming of the data processors which capture and use the data on the completed forms. The architecture encompasses the interactive operation of a host processor and one or more workstations in a data processing system. It includes the interaction between a host processor and a workstation in providing a list of common operand names which are meaningful to an application program running on the host. It includes the operation of the workstation creating a new document form using the list of common operand names. It includes the workstation performing character recognition of the filled-out form, transforming its information into coded data. It includes the workstation assembling a field data segment for each field, containing the common operand, the coded data and the popular name for the field. And it includes the operation of the host processor receiving the assembled field data segments from the workstation and providing the coded data to the application program which processes the information right from the form.

27 Claims, 32 Drawing Sheets

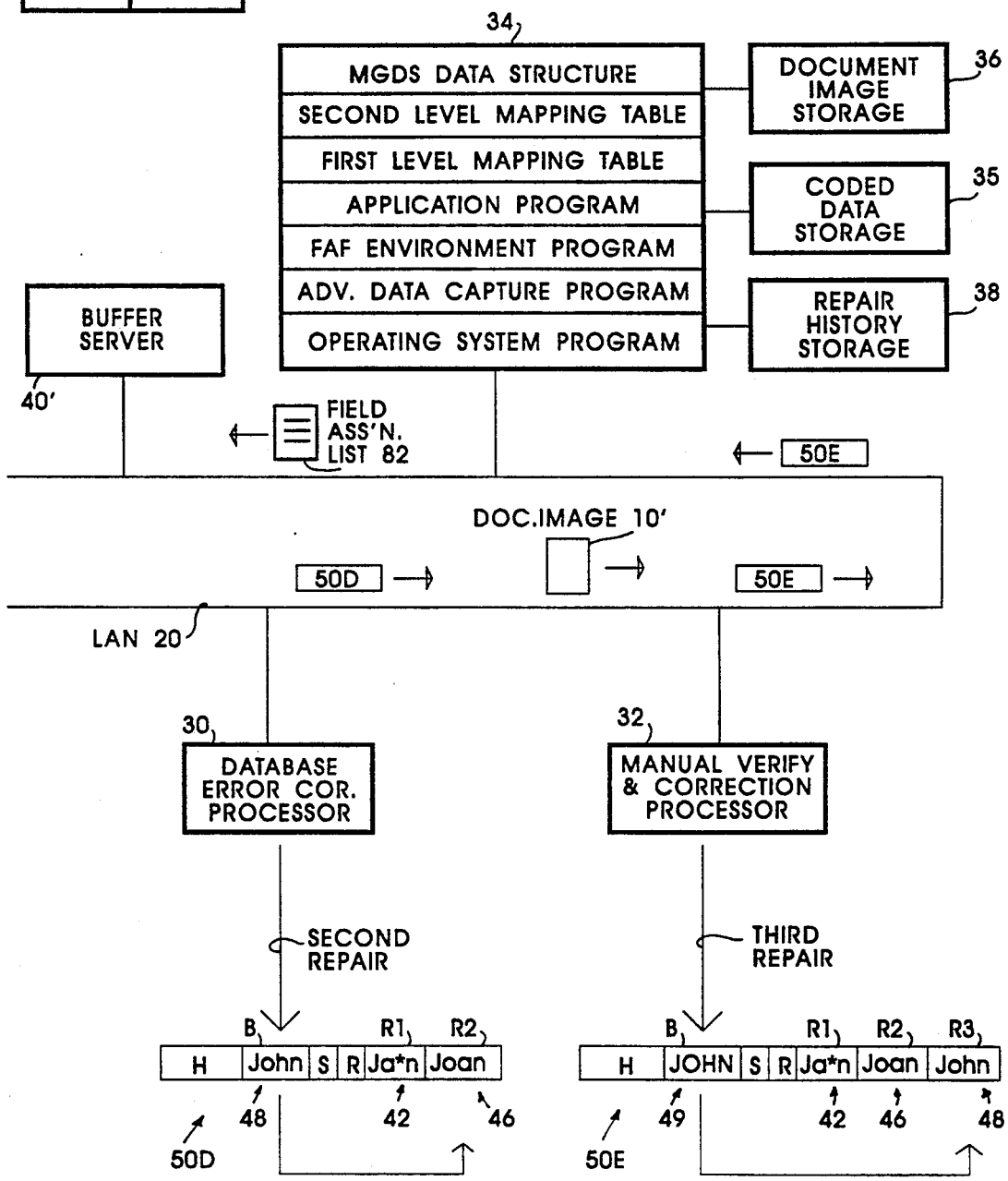

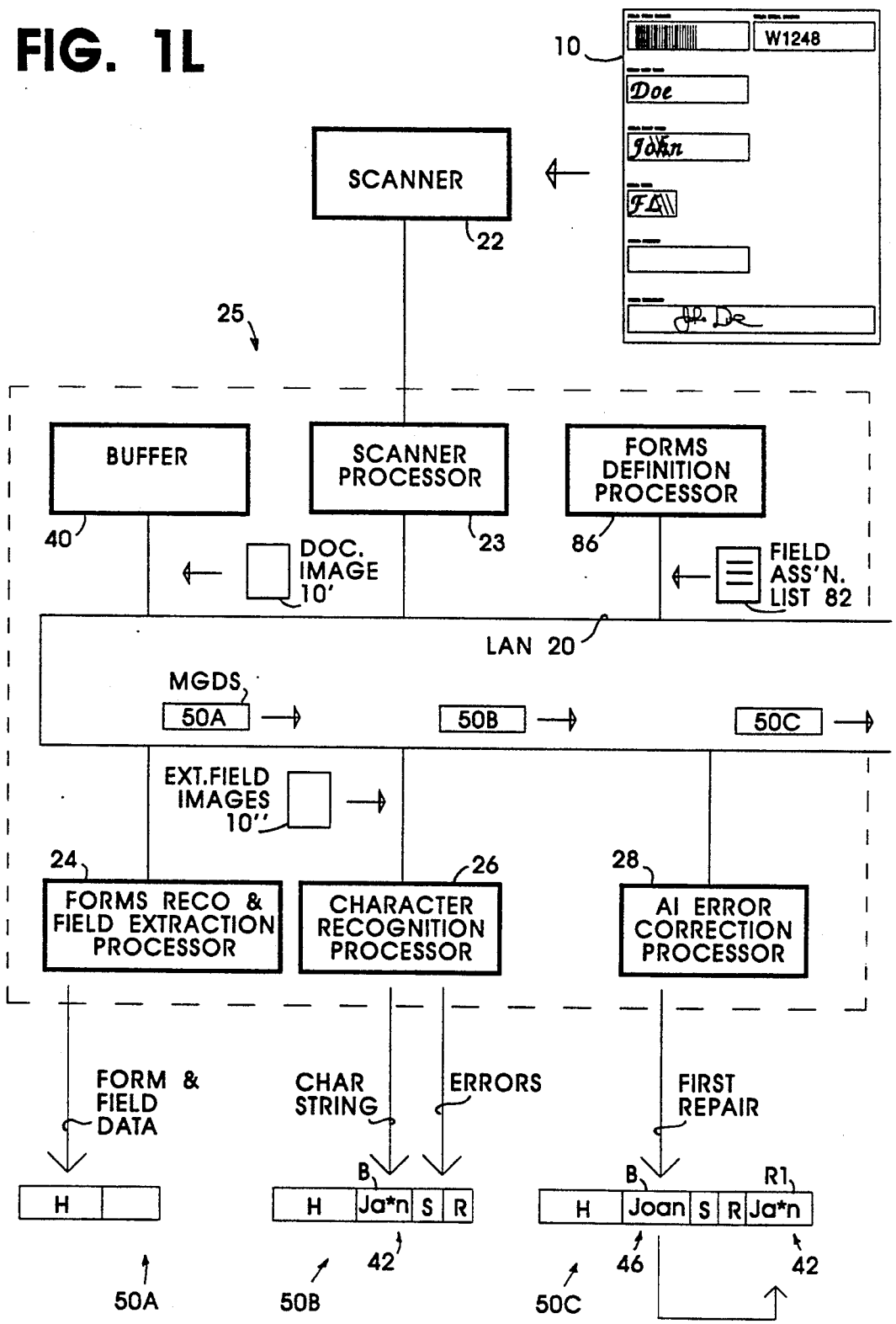

| FIELD: FORM NUMBER | FIELD: SERIAL NUMBER |

11F

12F

FIELD: LAST NAME

14F

13

Insurance Claim Form

FIELD: FIRST NAME

16F

17

FIELD: STATE

12aF

FIELD: ADDRESS

12bF

FIELD: SIGNATURE

FIELD: FORM NUMBER

Insurance
Claim Form

Zed Corporation

11ZF

FIELD: SURNAME

FIELD: GIVEN NAME

14ZF

16ZF

FIELD: SERIAL NUMBER

12ZF

FIELD: AMOUNT

12aZF

FIELD: REASON

12bZF

FIELD: SIGNATURE

Insurance Claim Form

Zed Corporation

FIELD: FORM NUMBER
[barcode]
11ZF

FIELD: SURNAME
*Doe*
14ZF

FIELD: GIVEN NAME
*John*
16ZF

FIELD: SERIAL NUMBER
X2525
12ZF

FIELD: AMOUNT
$100
12aZF

FIELD: REASON
*Check up*
12bZF

FIELD: SIGNATURE
[signature: John Doe]
44ZF

10Z'

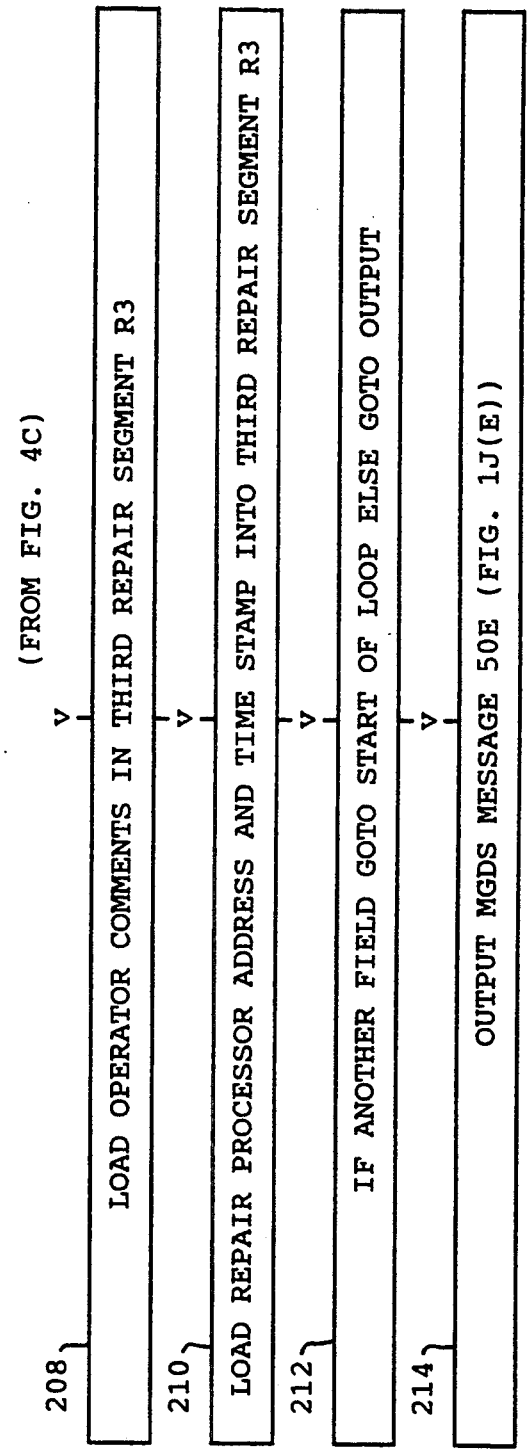

| 50E | FIELD SEG. 52 | | FIELD SEG. 54 | | FIELD SEG. 56 | | FIELD SEG. 12b | | FIELD SEG. 44 | | FIELD SEG. 12 | |
|---|---|---|---|---|---|---|---|---|---|---|---|---|
| MGDS | 1ST FIELD INFO | BUF- FER B | 2ND FIELD INFO | BUF- FER B | 3RD FIELD INFO | BUF- FER B | 4TH FIELD INFO | BUF- FER B | 5TH FIELD INFO | FLD IMG | 6TH FIELD INFO | BUF- FER B |
| → | → | Doe | → | JOHN | → | Fla. | → | | → | | → | W1248 |

| SECOND LEVEL MAPPING TABLE 552 | | INSURANCE CLAIM PROC. APPLICATION PROG. 556 |
|---|---|---|
| FIELD ASS'N LIST 82 | PROGRAM VARIABLE LIST 83 | GET AGENT/EMPLOYER_ID<br>IF 1ST CHAR = "X", THEN ID = "ZED CORPORATION" |
| DATA_1 | INSURED_LAST_NAME | GET INSURED_LAST_NAME |
| DATA_2 | INSURED_FIRST_NAME | GET INSURED_FIRST_NAME<br>CALL FAF(B) TO ACCESS EMPLOYEE RECORDS |
| DATA_3 | INSURED_STATE | GET SIGNATURE_BIT_MAP |
| DATA_4 | INSURED_ADDRESS | CALL SIGNATURE VERIFY ROUTINE |
| DATA_5 | AGENT/EMPLOYER_ID | GET AMOUNT_CLAIMED<br>PRINT CHECK |
| DATA_6 | AMOUNT_CLAIMED | RETURN |
| DATA_7 | REASON_CODE | GET AGENT/EMPLOYER_ID<br>IF 1ST CHAR = "W", THEN ID = "AGENT" |
| DATA_8 | OTHER_INSURANCE | CALL FAF(B) TO ACCESS AGENT RECORDS |
| IMAGE_1 | SIGNATURE_BIT_MAP | CALL FAF(C) TO SEND DOCUMENT TO AGENT<br>RETURN |

| FIRST LEVEL MAPPING TABLE 550 | | FOLDER APPLICATION FACILITY (FAF) PROGRAM 554 |
|---|---|---|
| DATA_1 | PRIMARY_INDEX_VALUE | (A) GET PRIMARY_INDEX_VALUE<br>GET SECONDARY_INDEX_VALUE<br>FORM INDEX RECORD FOR DOCUMENT : RTN |
| DATA_2 | SECONDARY_INDEX_VALUE | (B) ACCESS LIST OF RELATED INDEX RECORDS : RTN |
| DATA_5 | PRIMARY_ROUTING_VALUE | (C) GET PRIMARY_ROUTING_VALUE<br>ROUTE DOCUMENT TO WORKSTATION : RTN |
| 82' | 83' | |

| OBJECT DISTRIBUTION MANAGER | ADVANCED DATA CAPTURE PROGRAM 85 |
|---|---|
| DB2 DATABASE MANAGER | OBJECT ACCESS METHOD |
| MVS/ESA OPERATING SYSTEM 504 | COMMUNICATIONS MANAGER |

MEMORY 502

BUS 522

| CPU 510 | DOC. IMAGE STORAGE 36 | CODED DATA STORAGE 35 | DISPLAY & KEYBD 514 | LAN ADAPTER 516 | NETWORK ADAPTER 520 |

LAN 20

| MGDS | | |
|---|---|---|
| Length | ID | Data |
| ???? | 1100 | → |

| MGDS Version | | |
|---|---|---|
| Length | ID | Data |
| 0006 | 1121 | 0001 |

| Form Return Code | | |
|---|---|---|
| Length | ID | Data |
| 0006 | 1101 | 0000 |

| When To Convert | | |
|---|---|---|
| Length | ID | Data |
| 0005 | 112B | 00 |

| Form Class Name | | |
|---|---|---|
| Length | ID | Data |
| 000A | 1102 | FClass |

| Form Name | | |
|---|---|---|
| Length | ID | Data |
| 0009 | 1103 | FType |

| General Code Page | | |
|---|---|---|
| Length | ID | Data |
| 0006 | 1122 | 0352 |

| Unrecoed Char. Flag | | |
|---|---|---|
| Length | ID | Data |
| 0005 | 1104 | * |

| Number of Fields | | |
|---|---|---|
| Length | ID | Data |
| 0006 | 1105 | 0003 |

| Form Code Page | | |
|---|---|---|
| Length | ID | Data |
| 0006 | 1106 | 0352 |

| Host Form Code Page | | |
|---|---|---|
| Length | ID | Data |
| 0006 | 112C | 01F4 |

| Host Code Page | | |
|---|---|---|
| Length | ID | Data |
| 0006 | 1111 | 01F4 |

| Page Information | | |
|---|---|---|
| Length | ID | Data |
| ???? | 1127 | → |

| Page Information | | |
|---|---|---|
| Length | ID | Data |
| ???? | 1127 | → |

| Field Information | | |
|---|---|---|
| Length | ID | Data |
| ???? | 1107 | → |

| Field Information | | |
|---|---|---|
| Length | ID | Data |
| ???? | 1107 | → |

| Field Information | | |
|---|---|---|
| Length | ID | Data |
| ???? | 1107 | → |

FIG. 7B

| Page Information | | | Page Number | | | Page Resolution | | | Page Orientation | | |
|---|---|---|---|---|---|---|---|---|---|---|---|
| Length | ID | Data | Length | ID | Data | Length | ID | Data | Length | ID | Data |
| 0016 | 1127 | → | 0006 | 1128 | 0001 | 0006 | 1126 | 012C | 0006 | 111D | 0001 |

FIG. 7C

| Field Information | | | Rejected Char. RC | | | Suspicious Char RC | | | Field Association | | |
|---|---|---|---|---|---|---|---|---|---|---|---|
| Length | ID | Data | Length | ID | Data | Length | ID | Data | Length | ID | Data |
| ???? | 1107 | → | 0006 | 110D | 0000 | 0006 | 110B | 0000 | 0006 | 1109 | AUTO |

| Field Name | | | Field Form Page | | | Field Coordinates | | |
|---|---|---|---|---|---|---|---|---|
| Length | ID | Data | Length | ID | Data | Length | ID | Data |
| 000A | 110E | Unit # | 0006 | 1120 | 0001 | 0014 | 110C | 000000640000000320000012C000000C8 |

| Coded Data | | | Reject Char. Info | | | Reject Char. Info | | |
|---|---|---|---|---|---|---|---|---|
| Length | ID | Data | Length | ID | Data | Length | ID | Data |
| ???? | 1112 | → | 0016 | 110F | → | 0016 | 110F | → |

FIG. 7D

| Coded Data | | Field Code Page | | | Character Buffer | | |
|---|---|---|---|---|---|---|---|
| Length | ID | Data | Length | ID | Data | Length | ID | Data |
| 0012 | 1112 | → | 0006 | 1113 | 01F4 | 0008 | 1108 | John |

FIG. 7E

| Reject Char. Info | | | Character Coordinates | | | Character Position | | |
|---|---|---|---|---|---|---|---|---|
| Length | ID | Data | Length | ID | Data | Length | ID | Data |
| 001E | 110F | → | 0014 | 1114 | 0000002600000003000000026A000000D8 | 0006 | 1115 | 0005 |

ADVANCED DATA CAPTURE ARCHITECTURE DATA PROCESSING SYSTEM AND METHOD FOR SCANNED IMAGES OF DOCUMENT FORMS

BACKGROUND OF THE INVENTION

1. Technical Field

The invention disclosed broadly relates to data processing systems and methods and more particularly relates to techniques for the capture of character recognition information derived from scanned images of document forms.

2. Related Patents and Patent Applications

This patent application is related to the co-pending U.S. patent application, Ser. No. 07/870,129, filed Apr. 15, 1992, entitled "Data Processing System and Method for Sequentially Repairing Character Recognition Errors for Scanned Images of Document Forms," by T. S. Betts, V. M. Carras, L. B. Knecht, T. L. Paulson, and G. R. Anderson, the application being assigned to the IBM Corporation and incorporated herein by reference.

This patent application is also related to the co-pending U.S. patent application, Ser. No. 07/870,507, filed Apr. 17, 1992, entitled "Data Processing System and Method for Selecting Customized Character Recognition Processes and Coded Data Repair Processes for Scanned Images of Document Forms," by T. S. Betts, V. M. Carras, and L. B. Knecht, the application being assigned to the IBM Corporation and incorporated herein by reference.

This patent application is also related to the co-pending U.S. patent application, Ser. No. 07/573,942, filed Aug. 28, 1990, entitled "Method and Apparatus for Document Image Management in a Case Processing System," by M. R. Addink, T. Leyba, C. Y. Hu, A. W. Holmes, C. A. Till, and J. J. Mullen, the application being assigned to the IBM Corporation and incorporated herein by reference.

This patent application is also related to the co-pending U.S. patent application, Ser. No. 07/693,739, filed Apr. 30, 1991, entitled "Apparatus and Method of Operation for a Facsimile Subsystem in an Image Archiving System," by H. F. DeBruin, D. C. Bailey, J. T. Argenta, and H. M. Morris, the application being assigned to the IBM Corporation and incorporated herein by reference.

This patent application is also related to the co-pending U.S. patent application, Ser. No. 07/305,828, filed Feb. 2, 1989, entitled "A Computer Implemented Method for Automatic Extraction of Data From Printed Forms," by R. G. Casey and D. R. Ferguson, the application being assigned to the IBM Corporation and incorporated herein by reference.

This patent application is also related to the U.S. Pat. No. 4,992,650, entitled "Bar Code Recognition Using PC Software," by P. J. Somerville, the patent being assigned to the IBM Corporation and incorporated herein by reference.

This patent application is also related to the U.S. Pat. No. 5,058,185, entitled "Object Management and Delivery System Having Multiple Object Resolution Capability," by R. E. Probst, G. L. Youngs, D. Rajagopal, C. A. Parks, and H. M. Morris, the patent being assigned to the IBM Corporation and incorporated herein by reference.

This patent application is also related to the U.S. Pat. No. 5,093,911, entitled "Distributed Image Storage and Retrieval System," by R. E. Probst, G. L. Youngs, D. Rajagopal, and C. A. Parks, the patent being assigned to the IBM Corporation and incorporated herein by reference.

3. Background Art

Document forms used for the submission of business-related data can have a variety of layouts, even for a narrowly defined line of business. This makes the automatic reading of document forms a challenging task. The purpose of a document form is to isolate information relating to a particular subject matter category into a named field on the form. If the data which has been written on the form can be automatically found and automatically read, then it can be entered as an operand into a computer program designed to perform the business task for which the information was submitted.

Economies of scale can be attained by consolidating the data processing tasks for related lines of business. However, the number of subject matter categories for which data is required is most likely different for each respective business area. Where the related lines of business use document forms for the submission of data related to their respective businesses, the document forms are likely to have different numbers of fields, to be ordered in different sequences, to be arranged in different patterns and to be named with different category names for each respective business area.

An example of this is the insurance industry. An insurer may offer fire insurance, casualty insurance and health insurance. These related lines of business are likely to have their data processing tasks consolidated, for economies of scale. However, the claim forms submitted to the insurer must be different for each respective type of insurance, since the number subject matter categories required for submitted data are not likely to be the same.

As time goes on, existing document forms for a particular line of business will be revised, altering the layout of the form, the order of the fields, the number of fields, or the names of the fields.

What is needed is a means to freely generate new document forms which can be automatically processed, even though the order, arrangement, name and number of the fields on the forms are changed.

OBJECTS OF THE INVENTION

It is therefore an object of the invention to provide a means to freely generate new document forms which can be automatically processed, in an improved manner.

It is another object of the invention to provide a means to flexibly generate new document forms which can be automatically processed, even though the order, arrangement, name and number of the fields on the forms are changed.

It is further object of the invention to provide a means to freely generate new document forms which can be automatically processed, without requiring any reprogramming of the data processors which recognize or use the information in the filled out form.

SUMMARY OF THE INVENTION

The invention is an advanced data capture architecture. It enables the user to freely define and redefine the format of document forms without requiring any reprogramming of the data processors which capture and use the data on the completed forms.

The advanced data capture architecture invention encompasses the interactive operation of a host processor and one or more workstations in a data processing system. It includes the interaction between a host processor and a workstation in providing a list of common operand names which are meaningful to an application program running on the host. It includes the operation of the workstation creating a new document form using the list of common operand names. It includes the workstation performing character recognition of the filled-out form, transforming its information into coded data. It includes the workstation assembling a field data segment for each field, containing the common operand, the coded data and a popular name for the field.

And it includes the operation of the host processor receiving the assembled field data segments from the workstation and providing the coded data to the application program which processes the information read from the form.

The invention is applied in a data processing system which includes a host processor running an operating environment application program, such as IBM's Folder Application Facility program (FAF). An operating environment program provides services to other application programs which are running concurrently in a multi-tasking or multi-processing mode. Services performed by the FAF operating environment program include managing a system of folder groups for digitized document images and related coded data (collectively referred to as objects), by assigning a common index value to the objects which relates them to a particular folder group. Object routing services are also provided by the FAF operating environment program, to enable the transmission of objects to various destinations in the data processing system.

The user's line of business includes the receipt of document forms which have been filled out with information necessary to the conduct of the business. The user has an application program running on the host computer concurrently with the FAF operating environment program. The application program receives the information on the forms and processes it in accordance with the needs of the business. The application program interacts with the FAF operating environment program to receive the information as coded data representing the various fields on the document form.

In accordance with the invention, the FAF operating environment program and the application program receive the coded data they need from an advanced data capture program. The advanced data capture program makes use of a first level mapping table to deliver coded data to the FAF operating environment program. And, the advanced data capture program makes use of a second level mapping table to deliver coded data to the application program.

The first level mapping table and the second level mapping table incorporate a field association list which provides a common set of operand names for the program variables of both the FAF operating environment program and the application program. The operand names are called field association names. In accordance with the invention, the field association list is transmitted to a workstation in the data processing network where the user wishes to create document forms.

In accordance with the invention, when the user at the workstation creates a document form which is intended to provide information to the application program at the host processor, the user specifies the characteristics of each field on the form in a respective field data segment. For each field he creates, the user must select one of the field association names provided in the field association list and enter it into the field data segment. The user then adds a convenient field name to the field data segment, which will be meaningful to anyone performing manual data repair or data entry at a workstation.

Additional characteristics are added to each data segment for each respective field being created. The aggregate of all the data segments for all of the fields created for the form are then stored as a master machine generated data structure (MGDS) at the workstation.

When a filled-out form is received at a workstation in the network, it is scanned in, forming a digitized image. Once the form is recognized, field coordinates associated with the master MGDS can be used to locate the respective fields. The fields are then subjected to character recognition and the resulting coded data is stored in the respective field data segments of the MGDS.

The MGDS includes a reference to the application program for which its coded data is intended. When the MGDS containing the coded data is received by the host processor, the advanced data capture program selects the corresponding first level and second level mapping tables.

The advanced capture program performs a table lookup operation in the first level mapping table, using the field association name in respective field data segments, and identifies the corresponding program variable in the FAF operating environment program. The identified program variable is set equal to the corresponding coded data in the field data segment. The FAF operating environment program then performs auto-indexing of the coded data object and/or the image object, as necessary.

The advanced capture program then performs a table lookup operation in the second level mapping table, using the field association name in respective field data segments, and identifies the corresponding program variable in the application program. The identified program variable is set equal to the corresponding coded data in the field data segment. The application program then makes calls to the FAF operating environment program for index services and object handling services and performs the desired line of business operations using the information filled in on the document form.

The resulting advanced data capture architecture invention provides a means to freely generate new document forms which can be automatically processed, even though the order, arrangement, name and number of the fields on the forms are changed.

DESCRIPTION OF THE FIGURES

These and other objects, features and advantages will be more fully appreciate with reference to the accompanying figures.

FIG. 1 shows the arrangement of FIG. 1L and FIG. 1R. FIG. 1L and FIG. 1R are an overall architectural diagram of the invention

FIG. 1F(C) illustrates the MGDS 50C after the artificial intelligence error correction processor 28 has completed its operations on all six of the fields in the form.

FIG. 1F(D) illustrates the MGDS 50D after the data base error correction processor 30 has completed its operations on all six of the fields in the form.

FIG. 1F(E) illustrates the MGDS 50E after the manual verify and correction processor 32 has completed its operations on all six of the fields in the form.

FIG. 1G(Z) illustrates the MGDS 50EZ for the second example form of FIG. 2A(Z).

FIG. 2A illustrates the master form 10F for a first example.

FIG. 2A(Z) illustrates the master form 10ZF for a second example.

FIG. 2B(Z) illustrates the master MGDS 50ZM corresponding to the master form 10ZF of FIG. 2A(Z), for the second example.

FIG. 2(Z) illustrates the scanned form image 10Z' of the second example form.

FIG. 4C and 4D illustrate the sequence of operational steps for the manual verify and correction process 32A.

FIG. 5B(Z) illustrates a detailed architectural diagram of the manual verifying correction processor 32, for the second example form of FIG. 2A(Z).

FIG. 5C illustrates a detailed architectural diagram of the host computer 34.

FIG. 6, comprising

FIG. 7A illustrates the form information portion FI of an MGDS.

FIG. 7B illustrates the page information portion PI for an MGDS.

FIG. 7C illustrates the field information format 54A for an MGDS.

FIG. 7D illustrates the coded data information portion 75 of an MGDS.

FIG. 7E illustrates the reject information portion S or R of an MGDS.

DISCUSSION OF THE PREFERRED EMBODIMENT

Figure 1A:
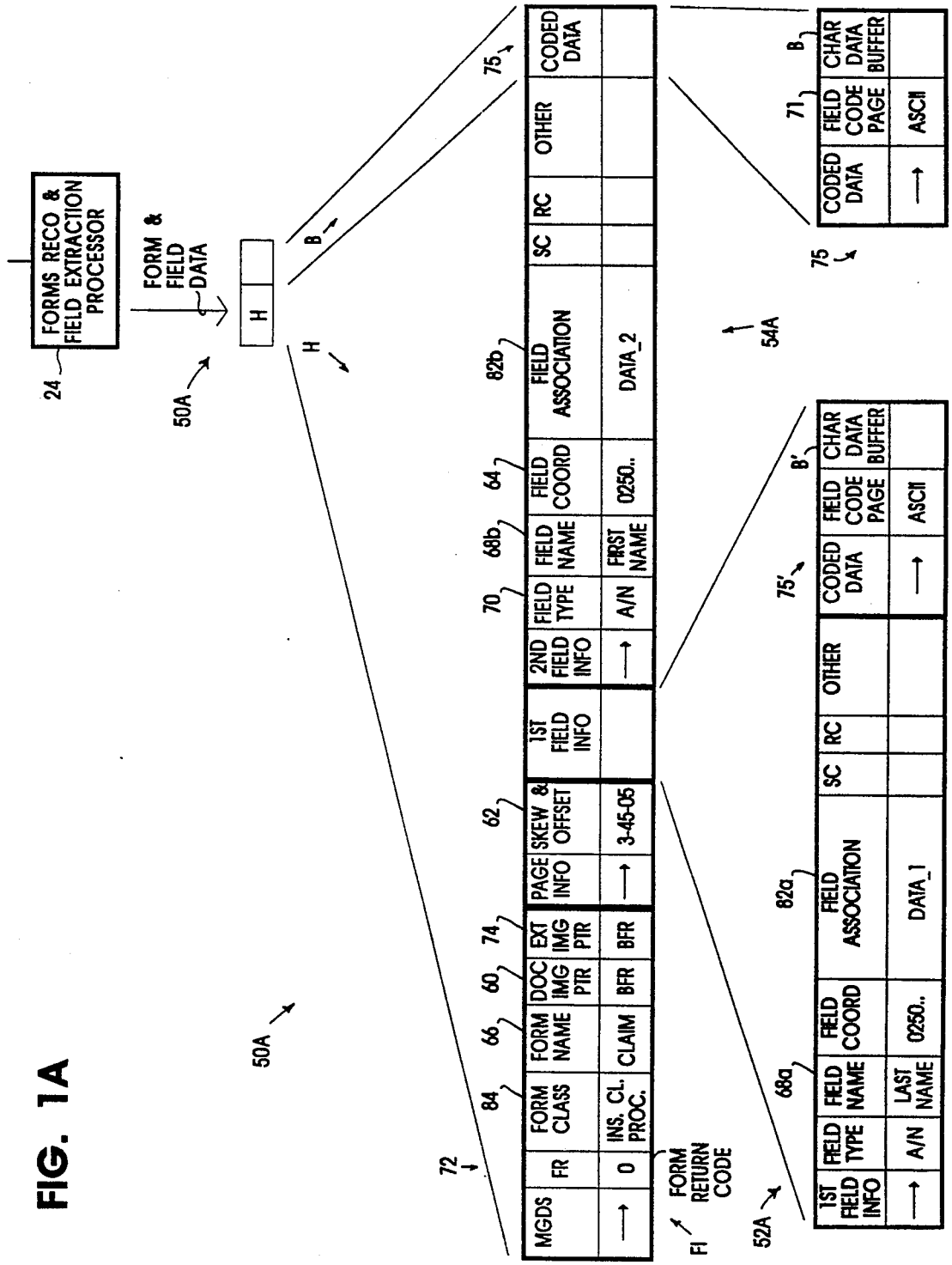
FIG. 1A illustrates the machine generated data structure (MGDS) 50A from the forms recognition and field extraction processor 24.

The invention is an advanced data capture architecture which is shown in the overall architecture diagram of FIG. 1. FIG. 1 is composed of FIG. 1L, for the left hand side, and FIG. 1R for the right hand side of FIG. 1. The two referenced co-pending patent applications by T. S. Betts, et al. describe the basic data processing architecture shown in FIG. 1, which carries out the sequential repair of character recognition errors for scanned images of document forms.

The advanced data capture architecture invention enables the user to freely define and redefine the format of document forms without requiring any reprogramming of the data processors which capture and use the data on the completed forms. The advanced data capture architecture invention encompasses the interactive operation of a host processor 34, shown in FIG. 1, and one or more workstations 25, also shown in the data processing system of FIG. 1. The invention includes the interaction between the host processor 34 and the intelligent forms processor 25, in providing a field association list 82 of common operand names which are meaningful to an application program 554 or 556 running on the host computer 34. A more detailed architectural diagram of the host computer 34 is shown in FIG. 5C.

The invention also includes the operation of the intelligent forms processor 25 in creating a new document form. The intelligent forms processor 25 includes the forms definition processor 86 which carries out the forms definition process 86A shown in the flow diagram of FIG. 4A. The forms definition processor 86 creates a new document form, such as the document form 10F of FIG. 2A, which is defined by the master machine generated data structure (MGDS) 50M, shown in FIG. 2B. The forms definition processor 86 accomplishes this operation by using the field association list 82 received from the host computer 34.

Figure 1B:
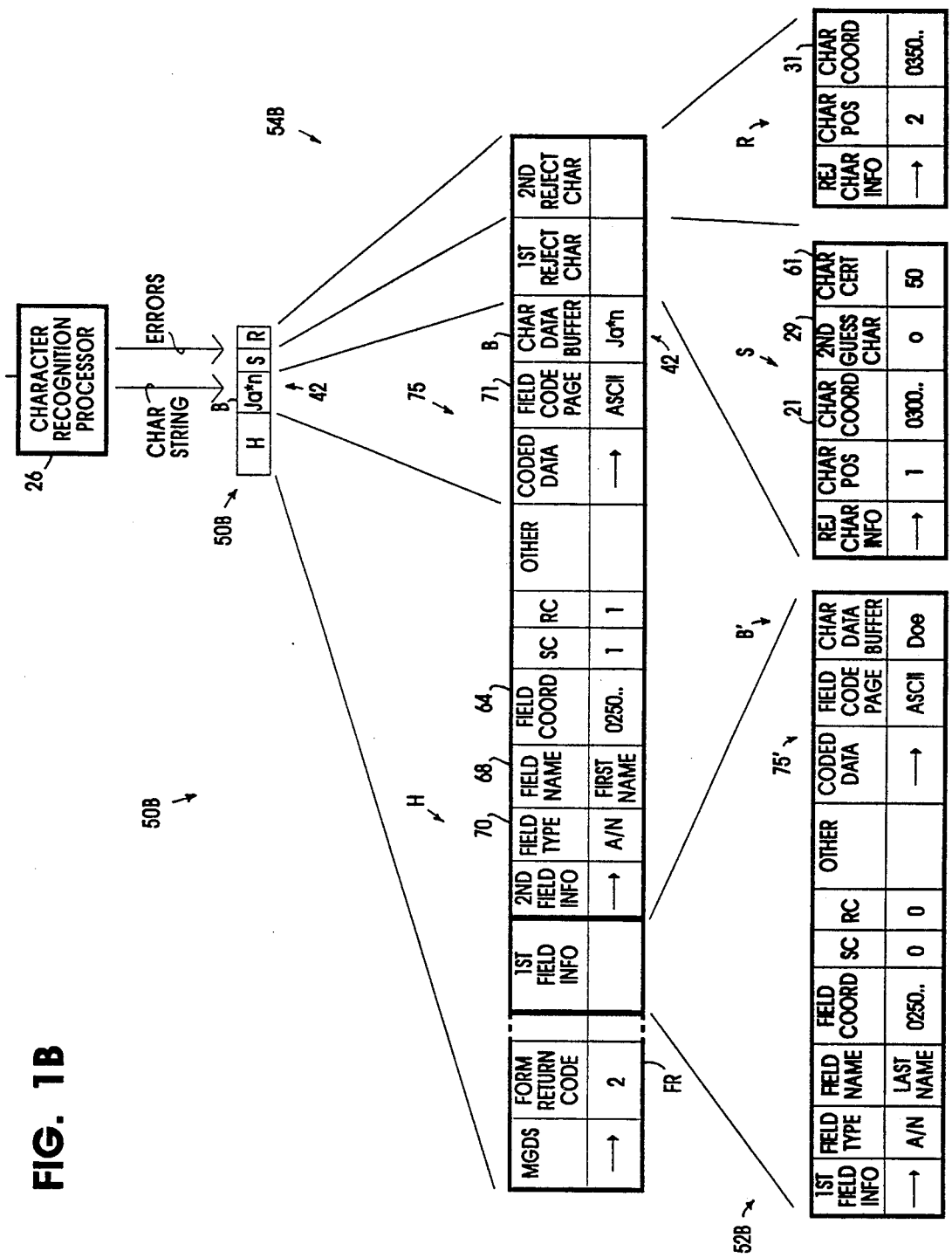
FIG. 1B illustrates the MGDS 50B output from the character recognition processor 26.
Figure 3:
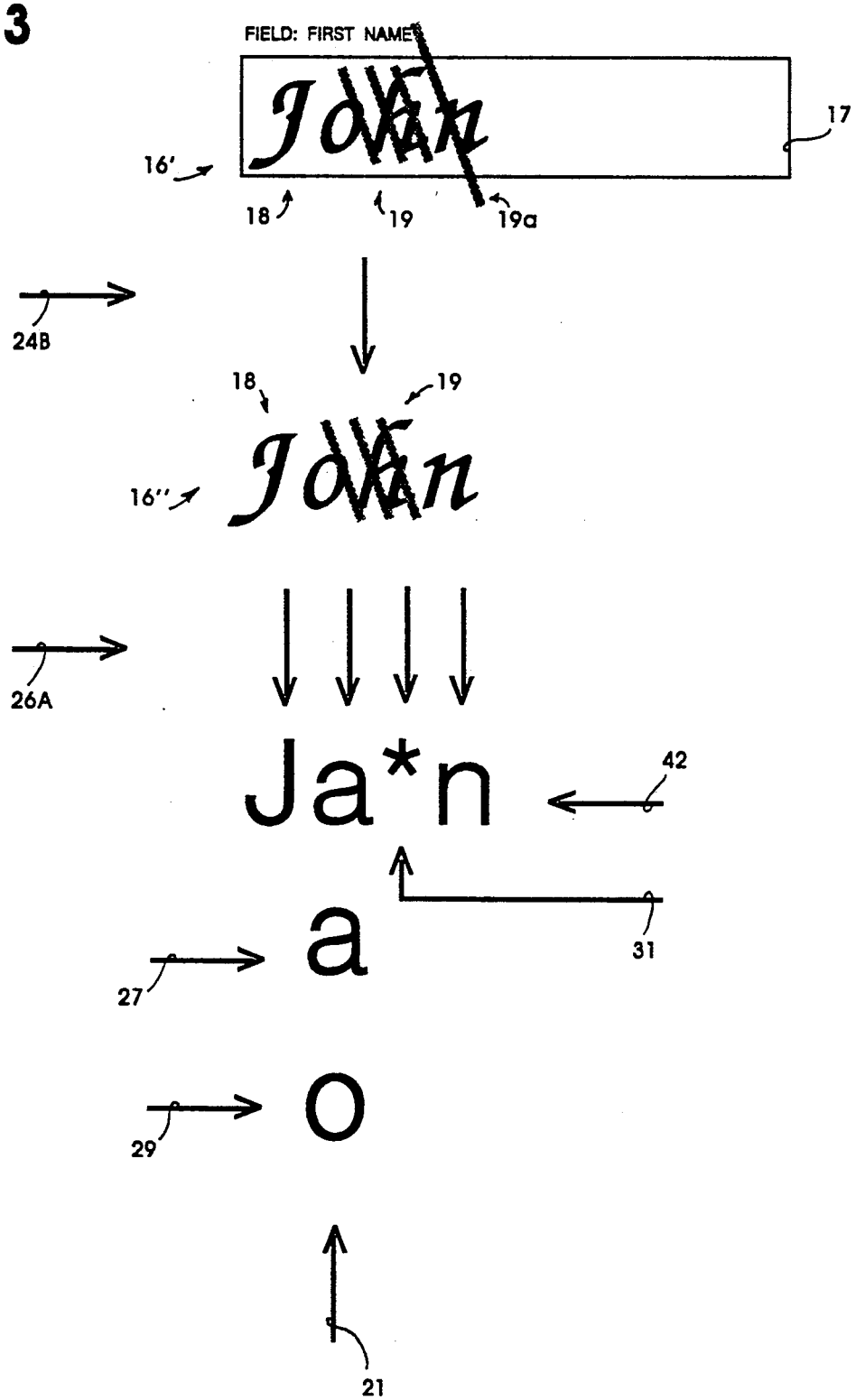
FIG. 3 illustrates the sequence of processing steps for the field 16' in the document form image 10' shown in FIG. 2C.

The invention further includes the intelligent forms processor 25 performing character recognition of the filled out document form. As was described in the two referenced co-pending patent applications by T. S. Betts, et al., the scanner 22 scans in an image 10' of the document 10, which is preprocessed by the scanner processor 23, yielding the document image 10'. The document image 10' is then subjected to forms recognition and field extraction in the processor 24 of FIG. 1, and thereafter the extracted field images 10" are subjected to character recognition processes by the character character recognition processor 26, also shown in FIG. 1. In performing the character recognition process, the resultant coded data may contain errors which are analyzed by the artificial intelligence error correction processor 28, also shown in FIG. 1. The sequence of forms recognition and field extraction, yields the MGDS 50A, as is shown in FIG. 1A. The MGDS 50A is then transferred to the character recognition processor 26, along with the extracted field images 10". The character recognition processor 26 outputs the MGDS 50B as shown in FIG. 1B, which includes the recognition coded data 42 in the buffer B. As can be seen in FIG. 3, the field image 16' is subjected to field extraction, resulting in the extracted field image 16". The extracted field image 16" is subject to character recognition, resulting in the coded data 42. The coded data 42 includes a rejected character position 31 and a suspicious character position 21.

The recognition coded data 42 in the MGDS 50B is then transferred from the character recognition processor 26 to the artificial intelligence error processor 28. As is described in the two co-pending U.S. patent applications by T. S. Betts, et al., the processor 28 then performs error correction steps on the recognition coded data 42, resulting in corrected coded data 46 being inserted into the buffer B of the MGDS 50C, which is output from the processor 28.

Additional error correction steps can be performed on the coded data 46, for example, the MGDS 50C, can be transferred to the database error correction processor 30, shown in FIG. 1. The processor 30 will perform database error correction processes on the coded data 46, resulting in further corrected coded data 48 being inserted into the buffer B of the MGDS 50D.

As is further described in the two co-pending patent applications by T. S. Betts, et al., additional error correction steps can be applied to the coded data in the buffer B of the MGDS 50D. For example, the MGDS 50D can be transferred to the manual verify and correction processor 32, where the coded data in Buffer B will be displayed to an operator, along with the document image 10'. The operator can then verify or correct the coded data from a visual inspection of the document image 10'. The resulting corrected data 49 is inserted into the Buffer B of the MGDS 50E.

The sequence of MGDS 50A, 50B, 50C, 50D and 50E are shown in the sequence of FIGS. 1A, 1B, 1C, 1D, and 1E, respectfully. A detailed description of these operations is given in the co-pending U.S. patent applications referred to above by T. S. Betts, et al. The resulting MGDS 50E is shown in greater detail in FIG. 1G. It can be seen in FIG. 1G, that the sequence of field extraction, character recognition and coded data repair on the six fields shown for the first example of scanned in form 10' in FIG. 2C, results in the formation of six field data segments shown in FIG. 1G for the MGDS 50E.

The invention includes the intelligent forms processor 25 assembling the field data segments in the MGDS 50E for each field, containing the common operand field association name 82B, for example, the coded data 49 and a popular name 68B, such as "first name" in the example field data segment 54. The field data segment 54 represents the coded data extracted from field 16' of the document image of FIG. 2C.

The invention further includes the operation of the host processor 34 shown in FIG. 5C in receiving the assembled field data segments in the MGDS 50E from the intelligent forms processor 25. The host processor 34 provides the coded data to the application programs 554 and 556, by means of the advanced capture process 85A shown in FIG. 4B. The application programs 554 and 556 then process the information which was read from the form 10.

The invention is applied in a data processing system which includes a host processor 34 shown in FIG. 5C, running an operating environment application program 554, such as IBM's Folder Application Facility Program (FAF). An operating environment program 554 provides services to other application programs which are running concurrently in a multi-tasking or multi-processing mode. Services performed by the FAF operating program 554 include managing a system of folder groups for digitized document images and related coded data (collectively referred to as objects), by assigning a common index value to the objects which relates them to a particular folder group. Reference can be made to Table 1 which shows some example routines in the folder application facility program 554. A first routine (A), consisting of steps 800–806, will perform an auto indexing operation, assigning an index value to a new object received by the system. Step 800 will get a primary index value, step 802 will get a secondary index value, both of which are obtained from the coded data in the MGDS 50E received from the intelligent forms 25. Then, in step 804, the program 554 will form an index record for the document. Then, step 806 returns to the main program. The index record formed for the document will enable the document to be related to other documents in the same folder group.

Another service performed by the FAF operating program of 554 is to access related documents. This is performed by the routing (B) consisting of steps 810 and 812 in Table 1. Step 810 accesses a list of related index records for a given document index value. The, step 812 returns to the main program. The routine enables the identification of documents which are related to given documents in the same folder group.

Object routing services are also provided by the FAF operating environment program 554, to enable the transmission of objects to various destinations in the data processing system. This is carried out by the routine (C) shown in Table 1. Routine (C) consists of steps 820–824. Step 820 gets the primary routing value which is provided from the coded data in the MGDS 50E. Then, step 822 routes the document to the workstation, in accordance with the primary routing value. Then, step 824 returns to the main program. Routine C enables the transmission of image objects or coded data objects to any destination in the data processing system.

The principles of operation of the Folder Application Facility program are described in the U.S. patents to R. E. Probst, et al., cited above and also in the co-pending U.S. patent application to M. Addink, et al., cited above.

Figure 2B:
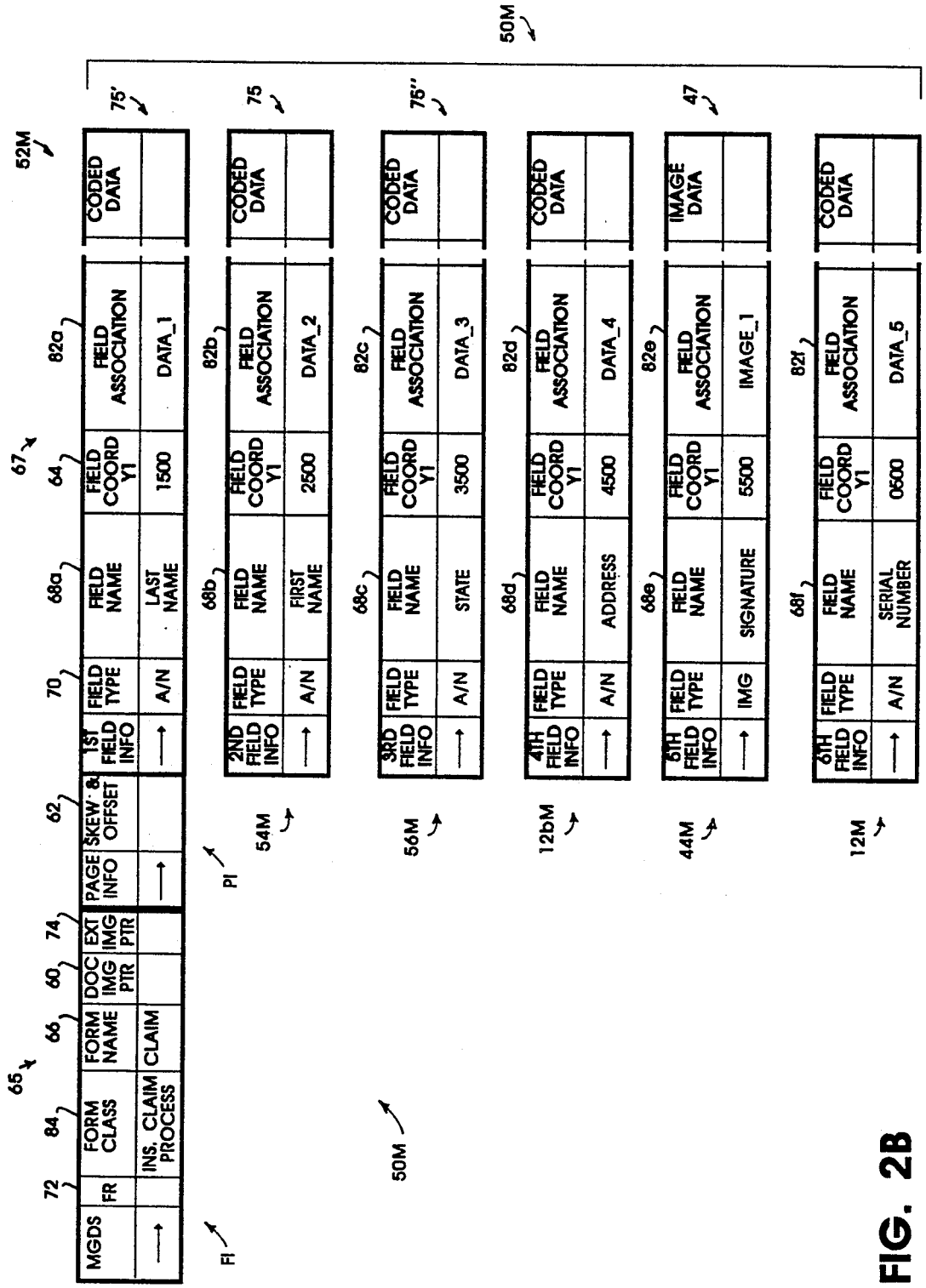
FIG. 2B illustrates the master MGDS 50M corresponding to the master form 10F of FIG. 2A, for the first example.
Figure 2B:
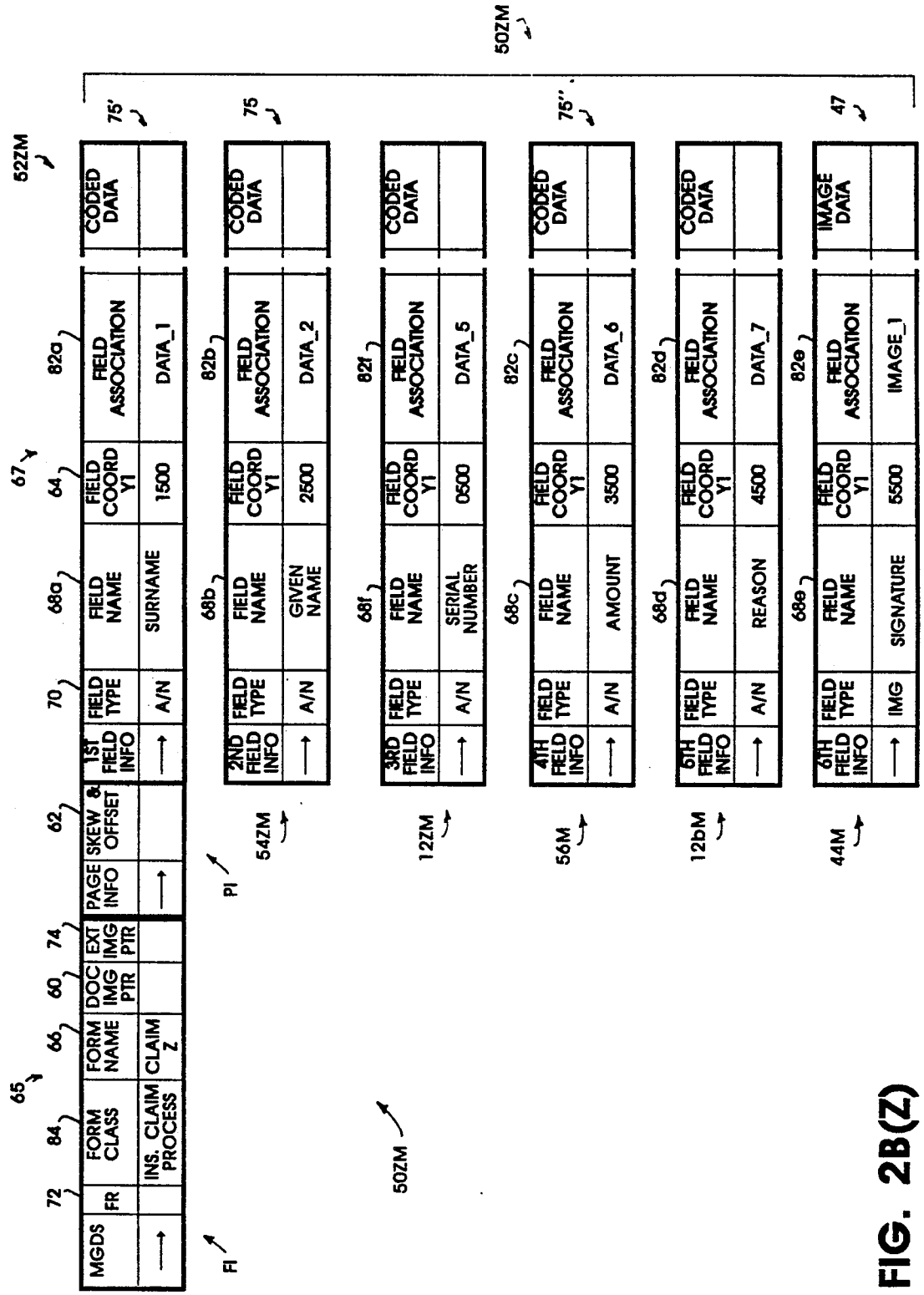
Figure 2C:
FIG. 2C illustrates the scanned form image 10' of a document form, for the first example.

The user's line of business may include the receipt of filed out, as is shown for the filled out form in FIG. 2C. Forms will be filled out with information necessary to the conduct of the business. The user will have an application program 556 running on the host computer 34, concurrently with the FAF operating program 554. The application program 556 is shown in Table 2, as an insurance claim processing application program. The program consists of steps 850–878.

The application program 556 receives the information on the forms, as is provided by the MGDS 50E, and processes that information in accordance with the needs of the business. The application program 556 will interact with the FAF operating program 554, to receive the information as coded data representing the various fields on the document form 10', shown in FIG. 2C.

The insurance claim processing application program 566 in Table 2, has two routines shown, the first routine are steps 850–868 for processing insurance claims forms from employees of the ZED Corporation. The second routine of program 556 consists of steps 870–878, which processes insurance claim forms from customers of an insurance agent.

The first routine in the application program 556 of Table 2, starts at step 850 and gets the agent/employer ID from the MGDS 50E. Then in step 852, if the first character in the agent/employer ID is "x," then the ID is determined to be for a claim from an employee of the ZED Corporation. Then in step 854, get the insured last name and in step 856, get the insured first name. This data comes from the MGDS 50E. Then in step 858, the application program 556 calls the FAF operating environment program 554 at routine (B), to access employee records. Then in step 860, get the signature bit map, obtains a bit map which is also provided by the MGDS 50E. Then in step 862, call the signature verify routine, will perform a signature verification operation on the bit map obtained from the MGDS 50E. Then in step 864, the application program 556 will get the amount claimed, which is data provided by the MGDS 50E. Then in step 866, a check is printed and in step 868, the program returns to the main program.

In the second routine of the application program of 556 of Table 2, step 870 gets the agent/employer ID which is data from the MGDS 50E. Then in step 872, if the first character of the agent/employer ID data is a "W," then the ID is determined to be for an insurance claim form obtained from the customer of an agent. Then step 874, the application program 556 calls routine (B) of the FAF operating environment program 554 to access the agent records. Then in step 876, the application program 556 calls the FAF routine (C) to send the document image and its coded data as objects to the agent at his workstation in the data processing network. Then in step 878, program 556 returns to the main program.

It should be appreciated that the FAF operating environment program 554 is not the only type of operating environment program which would be suitable in carrying out the invention. Other types of operating environment programs are, for example, the Presentation Manager environment program in IBM's OS/2 Operating System, or the Windows environment program for DOS operating systems, which run on IBM's PS/2 data processor.

In accordance with the invention, the FAF operating environment program 554 and the application program 556 receive the coded data they need from an advanced data capture program 85. The advanced data capture program 85 carries out the process 85A shown in the flow diagram of FIG. 4B. The advanced data capture program 85 makes use of a first level mapping table 550 shown in FIG. 5C, to deliver coded data to the FAF operating environment program 554. Further, the advanced data capture program 85 makes use of a second level mapping table 552 to delivery coded data to the application program 556, as shown in FIG. 5C.

The first level mapping table 550 and the second level mapping table 552 in FIG. 5C incorporate a field association list 82 which provides a common set of operand names for the program variables of both the FAF operating environment program 554 and the application program 556. As can be seen in FIG. 5C, the field association list 82, in this example, consists of field association names data-1, data-2 ... data-8, image-1. The corresponding program variable list 83, shown in FIG. 5C, has corresponding program variables "insured last name," "insured first name,". . . "other insurance" and "signature bit map," respectively. Inspection of the second level mapping table 552 shown in FIG. 5C will show the relationship between the field association list 82 and the program variable list 83. In this example, the entire field association list 82 is included in the second level mapping table 552. However, it is not necessary that all of the program variables for the application program 556 and the operating environment program 554 be necessarily represented in the program variable list 83 contained in the second level mapping table 552. Some of the program variables may be contained in the first level mapping table 550 which are not contained in the second level mapping table 552.

Inspection of the first level mapping table 550, as shown in FIG. 5C, shows that three of the field association names from the field association list 82, are included in the partial field association list 82' of the mapping table 550. The partial list 82' includes the field association names data-1, data-2 and data-5, which correspond to program variable names for the FAF program 554 of "primary index value," "secondary index value," and "primary routing value," respectively.

The operand names are called field association names in the field association list 82. In accordance with the invention, the field association list 82 is transmitted to the intelligent forms processor 25, and in particular to the forms definition processor 86, in the data processing network, where the user wishes to create document forms.

In accordance with the invention, when the user, at the intelligent forms processor 25 creates a document form which is intended to provide information to the application program at the host processor 34, the user specifies the characteristics of each field on the form in a respective field data segment.

Figure 4A:
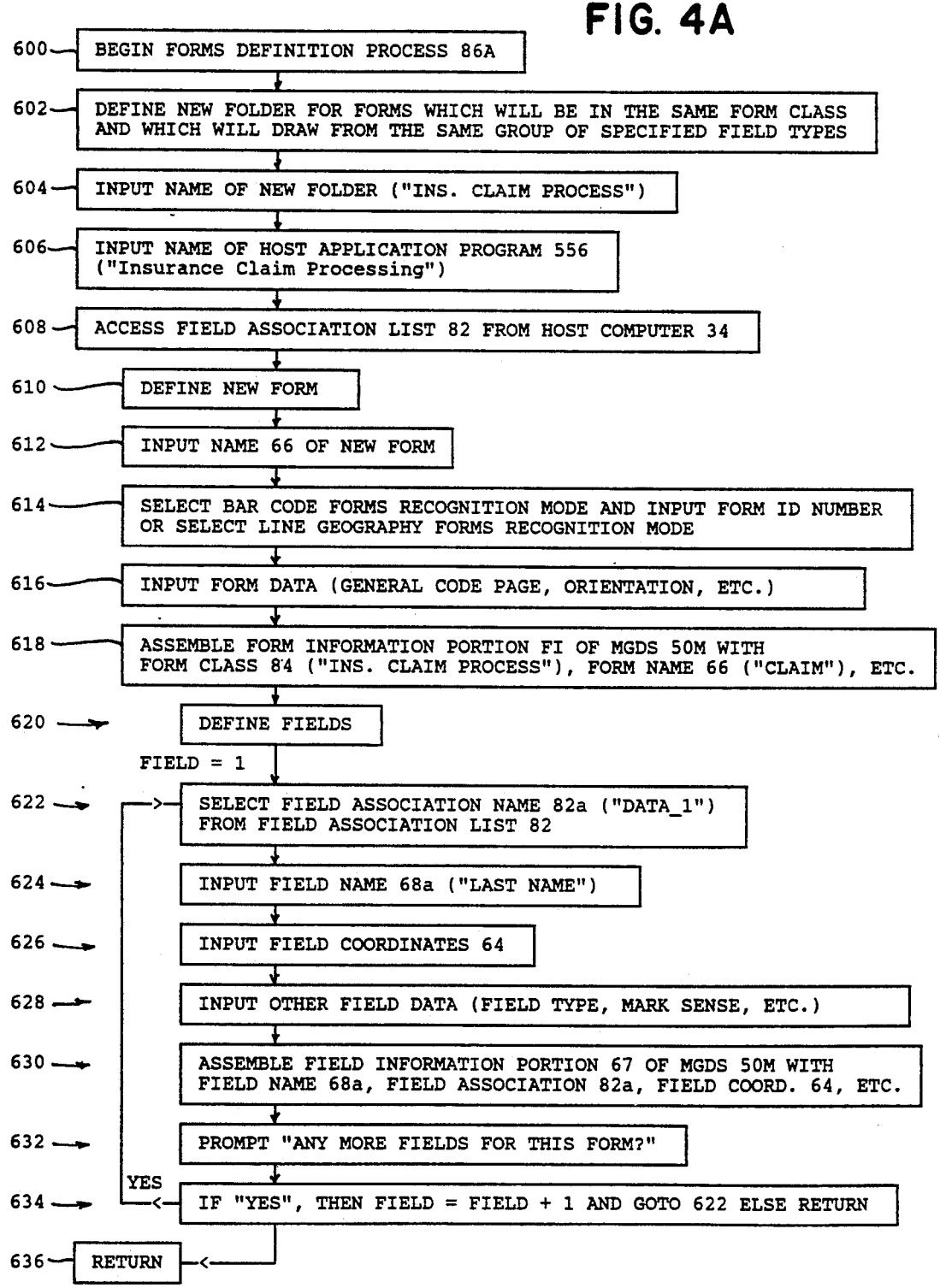
FIG. 4A is a flow diagram of the sequence of operational steps for the forms definition process 86A.

Reference to FIG. 4A will illustrate the process 86A carried out in the forms definition processor 86. Step 600 begins the forms definition process 86A. Step 602 defines a new folder for forms which will be in the same form class and which will draw from the same group of specified field types.

Step 604 of FIG. 4A inputs the name of a new folder, for example, "Insurance Claim Process." Then step 606 inputs the name of the host application program 556, in the example herein "Insurance Claim Processing." Then step 608 accesses the field association list 82 from the host computer 34.

Step 610 defines a new form. Step 612 continues the definition of the new form by inputting the name 66 of the new form. Then step 614 selects a bar code forms recognition mode and if that is selected the user will input the form ID number. Alternately, select the line geography forms recognition mode. Then step 616 inputs the form data, for example, the general code page orientation of the form, etc. Then in step 618, assemble the form information portion FI of the MGDS 50M with the form class 84, which is "Insurance Claim Process," the form name 66, which is "Claim" and other data.

Then step 620 begins the definition of the fields. The field variable is set equal to 1 and step 622 begins a loop which extends to step 634.

Step 622 selects the field association name 82a, for example, "Data-1," from the field association list 82. Then step 624 inputs the field name 68a, "Last Name." Then step 626 inputs the field coordinates 64. Then step 628 inputs other field data such as the field type, mark sense, and other field data. Then step 630 assembles the field information portion 67 of the MGDS 50M with the field name 68a, field association 82a, the field coordinates 64, and other data. Then step 636 displays a prompt to the user "Any More Fields For This Form?". If the user responds with a "Yes," then 634 increments the field variable by one and goes to step 622 to continue with the next field. Alternately, if the user answers with a "No," then the process flows to step 636 which returns to the main program.

Figure 5A:
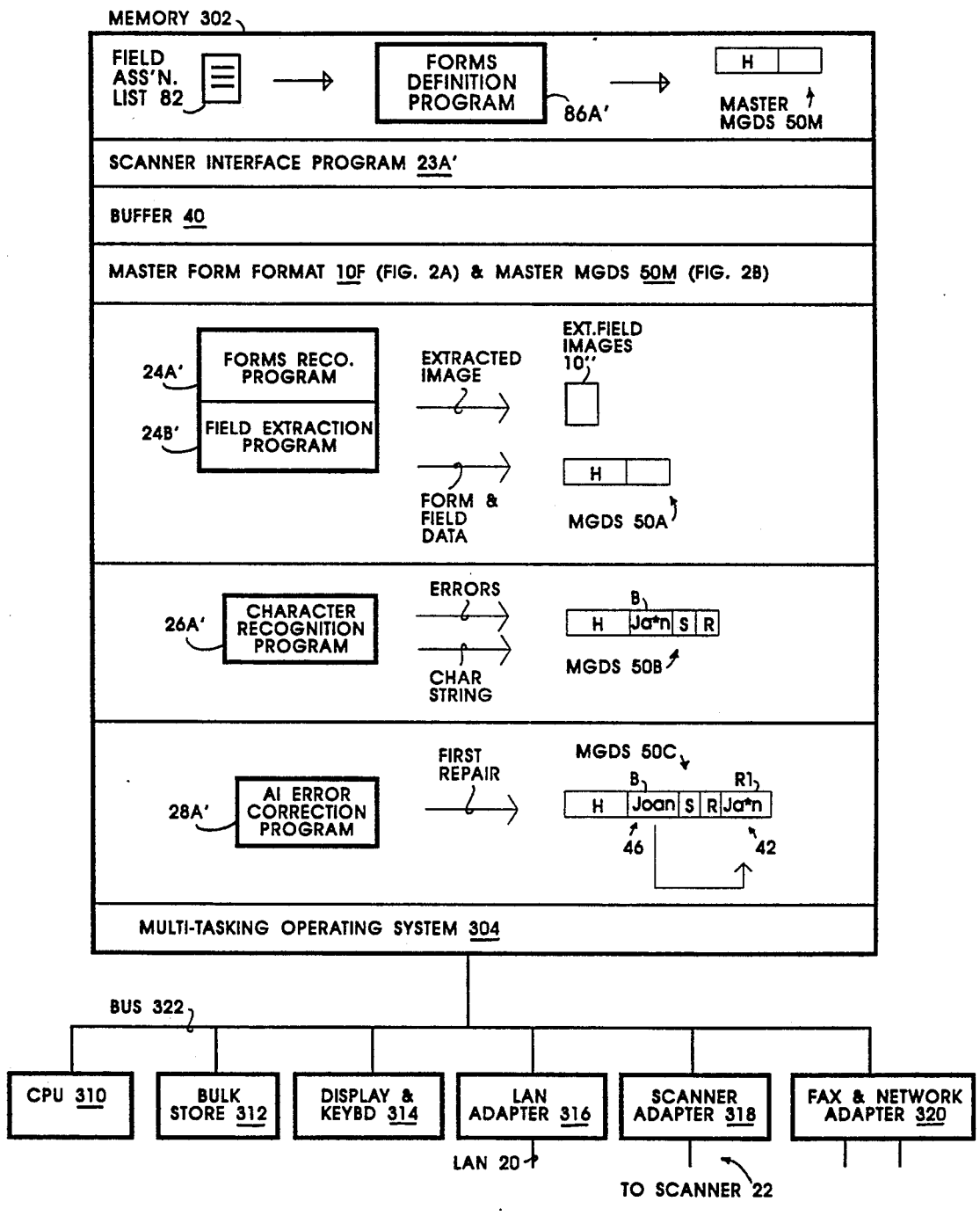
FIG. 5A illustrates a detailed architectural diagram of the intelligent forms processor 25.
Figure 5B:
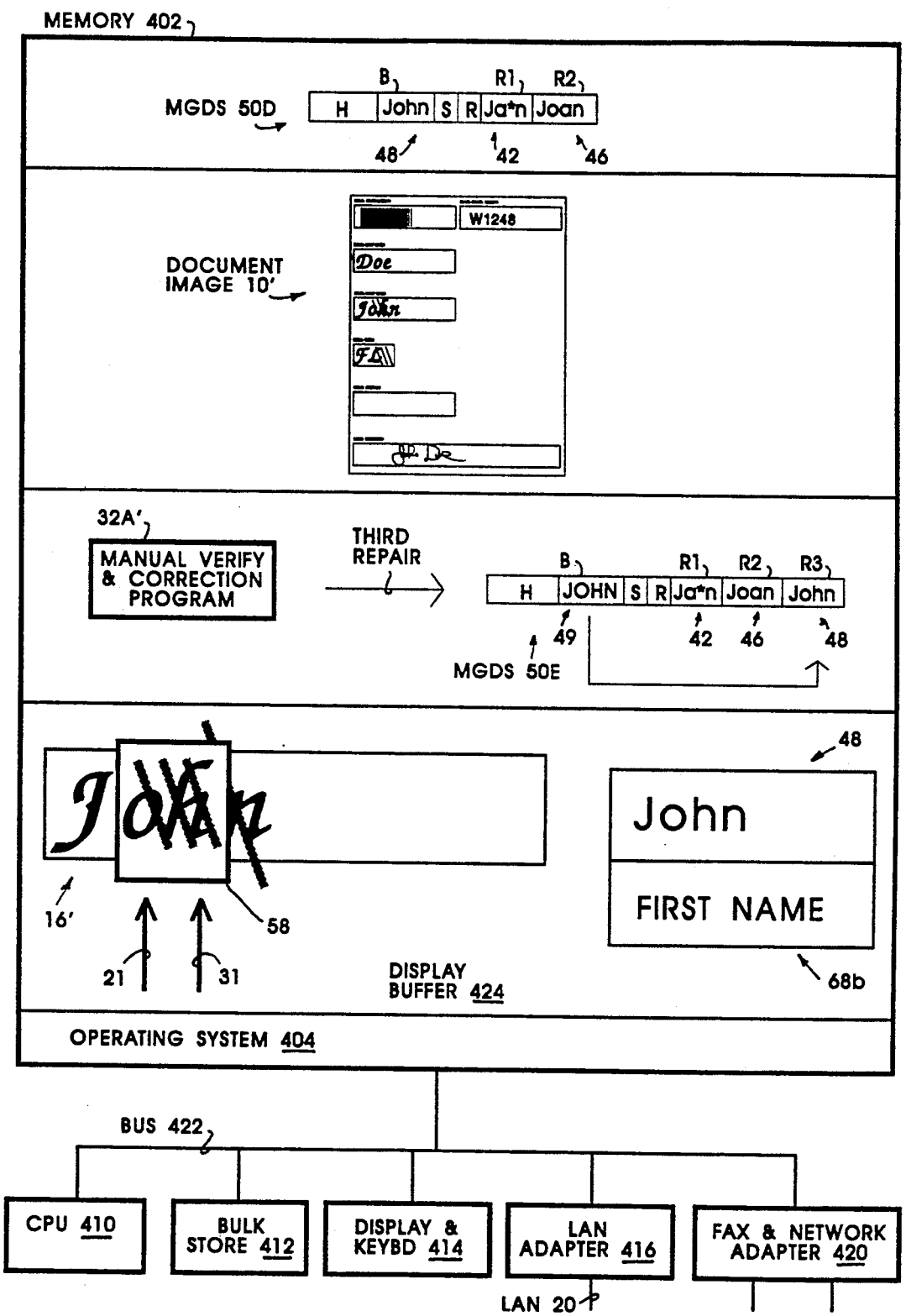
FIG. 5B illustrates a detailed architectural diagram of the manual verify and correction processor 32, for the first example form of FIG. 2A.
Figure 5B:
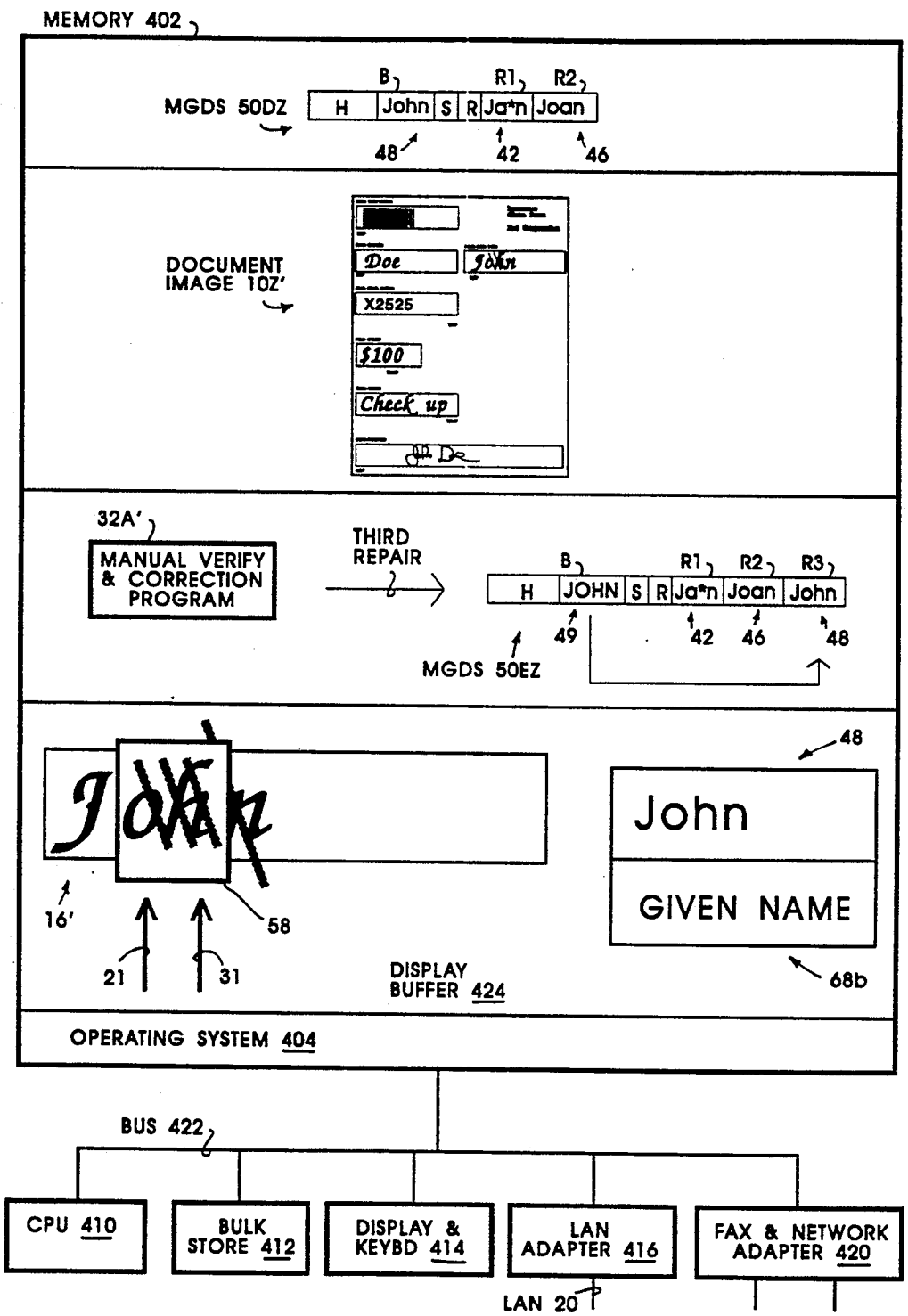

For each field which the user creates, the user must select one of the field association names 82*b* in FIG. 2B, which are provided in the field association list 82, and the user must enter the field association name into the field data segment, for example 54M. The user then adds a convenient field name, for example 68*b*, to the field data segment, which will be meaningful to anyone performing manual data repair or data entry at a workstation. This is important, for example, in the manual verify and correction processor 32. This is shown in FIG. 5B. In FIG. 5B, the manual verification and correction processor 32 is carrying out the verification and correction by the operator of the coded data 48 in the MGDS 50D. Of particular note is the display of the field name 68*b* which, in this example, is "First Name."

Additional characteristics are added to each data segment for each respective field being created, as can be seen in FIG. 2B. The aggregate for all data segments for all of the fields created for the form are then stored as the master Machine Generated Data Structure (MGDS) 50M, shown in FIG. 2B, at the intelligent forms processor workstation 25.

When a filled out form 10 is received at the workstation 25 in the system, it is scanned in, forming a digitized image 10' shown in FIG. 2C. Once the form is recognized, as shown in FIG. 1A, the field coordinate 64, associated with the master MGDS 50M, can be used to locate the respective fields, for example 14' and 16', in FIG. 2C. The fields are then subjected to character recognition and the resulting coded data is stored in the respective field data segments of the MGDS. It can be seen that the scanned form image 10' in FIG. 2C has its fields extracted forming the extracted field images 10" in FIG. 2D. The resulting MGDS 50A is shown in FIG. 1A. The character recognition processor 26 then performs a character recognition on the extracted field images resulting in the MGDS 50B, as shown in FIG. 1B, and also shown in FIG. 50 1F(B). Then the AI error correction processor 28 performs error correction operations on the coded data resulting in the MGDS 50C, shown in FIG. 1C, which is also shown in FIG. 1F(C). Then the database error correction processor 30 performs additional error corrections operations resulting in the MGDS 50D, shown in FIG. 1D, which is also shown in FIG. 1F(D). Then the manual verify and correction processor 32 performs additional verification or correction operations by an operator, resulting in the MGDS 50E, shown in FIG. 1E, and in FIG. 1F(E). The resulting MGDS 50E is shown in FIG. 1G. For the first example being followed herein, the field data segment 54 for the second field has the field name 68*b* of "First Name," the field association name 82*b* of "Data-2" and the coded data 49 of "JOHN."

The MGDS 50E shown in FIG. 1G, includes a reference 84 to the application program 556, for which its coded data is intended. When the MGDS 50E containing the coded data, for example, the coded data 49 "JOHN," is received by the host processor 34, the advance data capture program 85 selects the corresponding first level mapping table 550 and second level mapping table 552. This can be seen in the flow diagram of the sequence of operational steps for the advance capture process 85A shown in FIG. 4B.

Figure 4B:
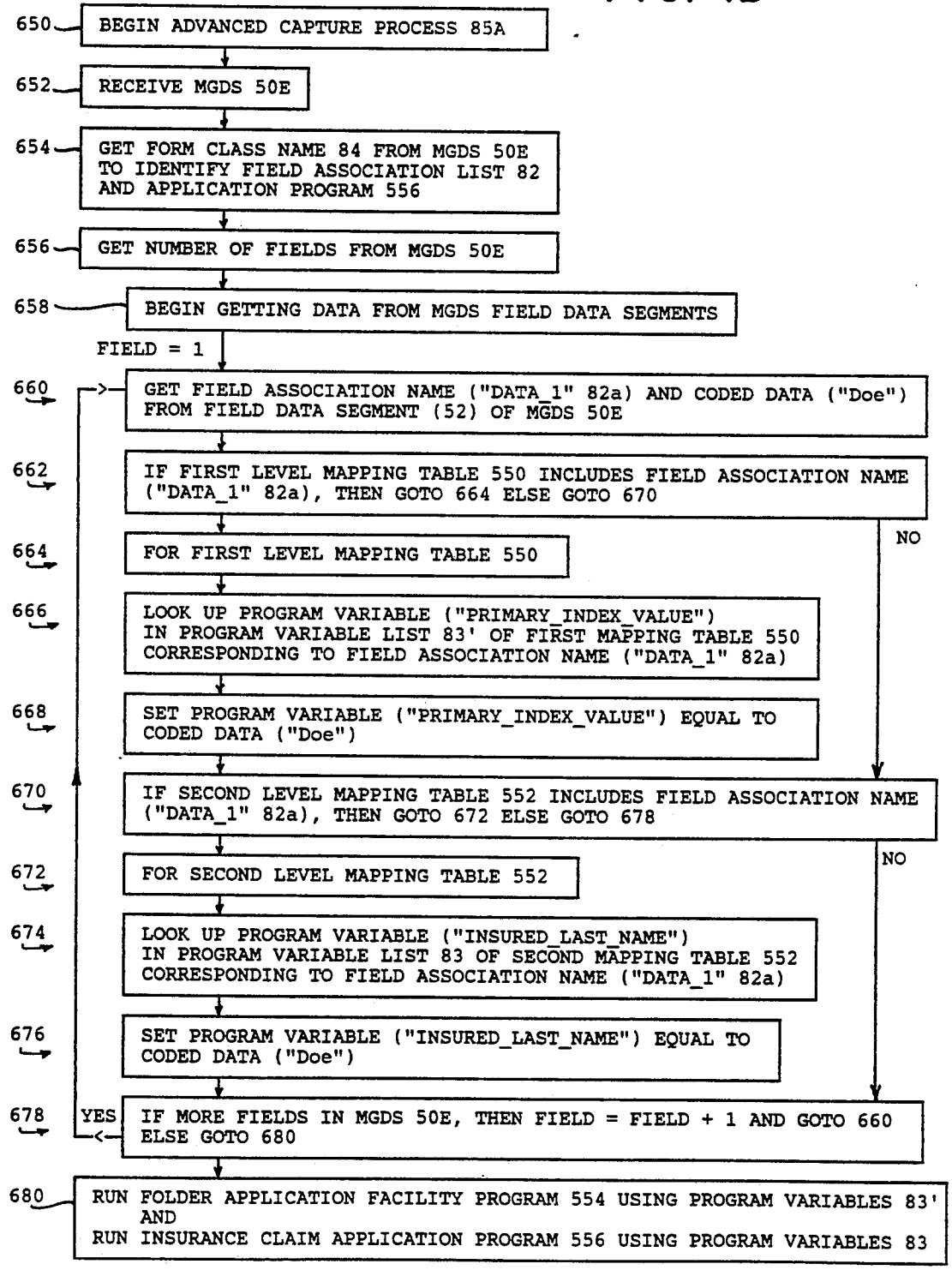
FIGS. 4B illustrates a flow diagram of the sequence of operational steps for the advanced capture process 85A.

The advance capture process 85A, begins at step 650 in FIG. 4B, and flows to step 652, where the MGDS 50E is received. Then, step 654 gets the form class name 84 from the MGDS 50E, to identify the field association list 82 and the application program 556 in the host processor 34. Then, step 656 gets the number of fields from the MGDS 50E.

Step 658 begins the operation of getting data from the MGDS field data segments. The field variable is set equal to 1 and a loop begins at step 650, which continues to step 678 of FIG. 4B.

Step 660 gets the field association name, for example "Data-1" 82*a*, and the corresponding coded data "Doe," from the field data segment, for example 52, of the MGDS 50E. This can be seen in the illustration of the MGDS 50E in FIG. 1G.

Then step 662 determines if the first level mapping table 550 includes the field association name, in this case "Data-1" 82*a*, and if it does, then the flow of FIG. 4B goes to step 664. Alternatively, if it does not, then the program goes to step 670. In step 664, for the first level mapping 550, step 666 performs a look-up operation, looking up the program variable, in this case, "Primary Index Value," in the program variable list 83' of the first mapping table 550, corresponding to the field association name, which in this case is "Data-1" 82*a*.

Then step 668 sets the program variable, in this case "Primary Index Variable," equal to the coded data, in this case "Doe."

Then the process of FIG. 4B flows to step 670, which determines if the second level mapping table 552 includes the field association name, in this case "Data-1" 82*a*, and if it does, then the process flows to step 672. If it does not, then the process flows to step 678.

In step 672, for the second level mapping table 552, step 674 performs a look-up operation, looking up the program variable, in this case "Insured Last Name," in the program variable list 83 of the second mapping table 552, corresponding to the field association name, in this case "Data-1" 82*a*.

Then step 676 sets the program variable, in this case "Insured Last Name," equal to the coded data, in this case "Doe."

Then the process of FIG. 4B flows to step 678, which determines if more fields are present in the MGDS 50E, and if they are, then the field variable is incremented by one and the process goes to step 660. If there are no more fields in the MGDS 50E, then the process goes to step 680.

In step 680, the folder application facility program 554 is run using the program variables 83'. Also, the insurance claim application program 556 is run using the program variables 83.

The advanced capture program 85 performs a table lookup operation in the first level mapping table 550 using the field association data name in the respective field data segments 54, and identifies the corresponding program variable 83' in the FAF operating environment program 554. The identified program variable is set equal to the corresponding coded data in the data field segment. The FAF operating environment program 554 then performs auto-indexing, using the routine "A," steps 800–806 of Table 1, auto-indexing the coded object and/or the image object 10' of FIG. 2C, as may be necessary.

The advanced capture program 85 then performs a table look-up operation in a second level mapping table 552, using the field association name in the respective data segment 54, and identifies the corresponding program variable 83 in the application program 556. The identified program variable is set equal to the corresponding coded data in the data field segment 54, of FIG. 1G. The application program 556 then makes calls to the FAF operating environment program 554, for index services such as routine (B) at steps 858 and at steps 874 and for object handling services, such as routine (C) at step 876, and performs the desire line of business operations using the information filled in on the document form.

The resulting advanced data capture architecture invention provides a means to freely generate new document forms which can be automatically processed, even though the order, arrangement, name and number of the fields on the forms are changed.

EXAMPLES

There are two examples of forms given herein, to show the versatility of the advanced data capture architecture invention. The first example is of an agent claim form. This first example involves FIG. 2A for the form 10F, FIG. 2B, for the master MGDS 50M, FIG. 2C, for the scanned image 10', FIG. 2D, for the extracted image 10'', FIG. 5B, for the manual verification and correction and processor 32, which displays the popular 68b "First Name" in the first example form, and FIG. 1G, which shows the MGDS 50E for the first example form.

A second example form is shown in FIG. 2A(Z) for the form 10ZF. This second example is for the ZED Corporation claim form. The figures illustrating the second example are FIG. 2A(Z) for the form, FIG. 2B(Z), which shows the master MGDS 50ZM, FIG. 2C(Z), which shows the scanned image of the form 10Z', FIG. 5B(Z), which shows the display of the popular name 68b, which is "Given Name," in the second example, and FIG. 1G(Z), which shows the MGDS 50EZ for the second example form 10ZF.

Both the first example form and the second example form are of insurance claims forms which are intended to provide information to the insurance claim process application program 556. It is a feature of the invention that two diverse document forms can be designed for use by the same application program, without reprogramming the application program 556.

FIRST EXAMPLE

The first example form is the insurance claim form for an agent, shown in FIG. 2A. When the agent form is filled out it will appear as shown in FIG. 2C, and will be characterized by a serial number which always begins with the letter W. The insurance company will design the first example form of FIG. 2A, using the forms definition process 82A. The resulting definition data set is embodied in the master MGDS 50M shown in FIG. 2B which is produced by the forms definition process 86A. As has been described, the field association list 82 provided by the host computer 34 is used to specify the field association names 82a–82f in FIG. 2B. The insurance company chooses its own customized set of field names 68a–68f to correspond with the respective association names. The master MGDS 50M which results from the forms definition process 86A can be stored in the buffer 40 of the intelligent forms processor 25. The master MGDS 50M can also be transmitted from the intelligent forms processor 25 to other workstations in the data processing system connected to the intelligent forms processor 25, where it is likely that copies of the master form 10F of FIG. 2A will be received from the public for the submission of information.

In the first example, the master form 10F of FIG. 2A is filled out by an insured customer of an agent of the insurance company. The insured customer fills out the form 10F, producing a hard copy form having the same appearance as the scanned form image 10' shown in FIG. 2C. The insured customer will fill in the serial number as he has been instructed by the agent, preceding the serial number with a W. The agent may have prepared pre-printed hard copy forms with serial numbers preceded by the W in the serial number field 12'. In either case, the insured customer of the agent will fill in the respective fields of the form 10F and will produce a filled-in form having the same appearance as the scanned form image 10' of FIG. 2C.

When the insured customer of the agent submits the filled-in form, it is scanned into the system by means of the scanner 22, resulting in the scanned form image 10' shown in FIG. 2C. The scanned form image 10' may then be stored in the buffer 40. Alternately, the scanned form image 10' may have been scanned in at another workstation in the network where the image will have been stored. The image can then be transmitted to the intelligent forms processor 25 over a data network connection, resulting in the document image 10' being present on the LAN 20. In still another alternate mode of receipt for the document image 10', it may be received from a facsimile transmission over the public telephone network. The facsimile image can be received at the intelligent forms processor 25, in a manner similar to that described in the Argenta, et al. patent application cited above.

The document image 10', can be received by several means and be present on the LAN 20. The scanned form image 10' can then be subjected to forms recognition and field extraction by the processor 24, followed by character recognition in the processor 26, resulting in the MGDS 50A and 50B, respectively. Additional error correction processes can be applied by the error correction processor 28, the error correction processor 30, producing the MGDS 50C and 50D, respectively.

A manual verification and correction may be desired on the coded data 48 in the MGDS 50D, and it is useful to have a display to the operator of the manual verify and correction processor 32, an accurate and meaningful representation of the field name 68B for the coded data presented to the operator. It can be seen in FIG. 5B for this first example, that the field name 68b for the second field will be displayed in the display buffer 424, along with the coded data 48. It is a feature of the invention that any workstation at which the coded data for a particular field of the form is to be viewed, will be identified by the customized field name 68b present in the MGDS at that stage.

As a result of the manual verify and correction process carried out by the processor 32, the final MGDS 50E is produced which is shown for this first example, in FIG. 1G. It is seen in FIG. 1G that the coded data for each respective field is represented in each field data segment. For example, the first field data segment 52 has the coded data "Doe" with the corresponding field association name "Data-1" 82a, and the corresponding field name "Last Name" 68a. Corresponding information for each of the six field data segments is available in MGDS 50E, as is shown in FIG. 1G.

When the MGDS 50E of the first example is transmitted from the character recognition and error correction processes to the host computer 34, the advance data capture program 85 will identify those field association names 82a, 82b, and 82f as having corresponding program variables 83' for the Folder Application Facility program 554. This is done by means of the first level mapping table 550.

The advance data capture program 85 will also identify in this first example, the field association names 82a–82f for the program variables 83 used in the insurance claim processing application program 556. This is done using the second level mapping table 552.

The insurance claim processing application program 556, operates upon the program variables 83 provided by the MGDS 50E of FIG. 1G, to perform the agent subroutine of the application program 556. Since the field association name 82f for the "serial number," has coded data that begins with a "W," step 872 of Table 2 for the application program 556 determines that the form 10F of FIG. 2A is a "agent" form. Thus the application program 556 performs step 874 to call the FAF(B) to access the agent records and then in step 876, it calls the FAF(C) to send the document to the agent.

Thus the first example has a first customized form 10F of FIG. 2A invoke a first "agent" subroutine in the insurance claim processing application program 556.

SECOND EXAMPLE

The second example form is shown in FIG. 2A(Z) and it is a form designed with different field names, different layout and different data types from the form in the first example of FIG. 2A, but it is intended to provide information to the same insurance claim processing application program 556. The form of the second example shown in FIG. 2A(Z) is an insurance form designed by the insurance company for its client the ZED Corporation. The ZED Corporation has employees who are the insured persons. It is they who will be submitting the forms to the insurance company.

The second example form 2ZF of FIG. 2A(Z) is designed in the intelligent forms processor 25 by the forms definition processor 86 operating upon the same field association list 82. The insurance company designs the form by specifying the field association names 82a–82f, the field names 68a–68f, and other data as is shown in the master MGDS 50ZM shown in FIG. 2B(Z). Note that the order of the field data segments which appear in the master MGDS 50ZM reflect the different layout of the fields in the master form 10ZF shown in FIG. 2A(Z). Also note that the field names are different, for example the field name in the second field data segment 54ZM of the second example is "Given Name."

After the insurance company has prepared the second form 10ZF it stores the second master MGDS 50ZM for later use when forms are received from employees of the ZED Corporation.

When a form is filled out by an employee of the ZED Corporation, it will have the appearance of the scanned form image 10Z' shown in FIG. 2C(Z). In order to distinguish the forms 10ZF and 10Z', the serial number for insurance forms submitted by employees of the ZED Corporation, will have the first character as a "X." This is designed to invoke a different subroutine in the insurance claim processing application program 556, namely the subroutine of steps 850-868 in Table 2.

When an employee of the ZED Corporation submits the insurance claim form, it will be scanned in and will have a scanned form image 10Z' as is shown in FIG. 2C(Z). Through the process of forms recognition and field extraction, and through the further processes of character recognition and error correction, as previously described, an MGDS 50D will be produced by the error correction processor 30, which can be presented to the manual verify and correction processor 32 for viewing by an operator. In accordance with the invention, the operator will be presented with the actual field name "Given Name" 68b when the operator views the coded data 48, as is shown in FIG. 5B(Z) for the second example.

After the manual verify and correction processor 32 has completed its operation, it will output the MGDS 50EZ shown in FIG. 5B(Z). The MGDS 50EZ will then be transmitted to the host computer 34 to invoke the appropriate subroutine of the insurance claim process application program 556.

The advance data capture program 85 will identify the field association names 82a, 82b and 82f for the Folder Application Facility program 554, using the first level mapping table 550.

The advance data capture program 85 will identify all of the field association names 82a–82f for the insurance claim processing application program 556, using the second level mapping table 552.

The insurance claim processing application program 556 will determine that the serial number in the second example begins with a "X" and it will then invoke the subroutine starting at 852 in Table 2 for the "ZED Corporation" insurance claim forms. The steps 852–868 will then be performed.

It is seen that the advance data capture architecture invention accommodates both versions of the form in the first and second examples, thereby enabling the consolidated processing of these two forms by the same insurance claims processing application program 556 and the same folder application facility program 554.

The following discussion reviews the system for consequentially repairing character recognition errors for scanned images of document forms, described in the co-pending U.S. patent application by T. S. Betts, et al. This additional description is included to facilitate an understanding of the advanced data capture architecture invention disclosed herein.

SEQUENTIAL REPAIR OF CHARACTER RECOGNITION ERRORS

The repair history for a particular field of a document form is assembled in a machine generated data structure (MGDS) message. The MGDS is used as a data interface between the sequential repair processes and processors in the system. The MGDS also serves as the repository for the history of the repairs to the particular misrecognized character string, for the purpose of maintaining an audit trail.

FIG. 1 shows an overall architectural description of the data processing system. FIG. 1 is partitioned into a left half FIG. 1L and a right half FIG. 1R. A hard copy document 10 is scanned into the system with a scanner 22, resulting in a document image 10' which is shown in FIG. 2C. An intelligent forms processor 25, shown in greater detail in the architectural drawing of FIG. 5A, provides the scanner interface process with the scanner 22. The intelligent forms processor 25, shown in dotted outline in FIG. 1, also includes the forms definition processor 86, a buffer 40, a forms recognition and field extraction processor 24, a character recognition processor 26 and an artificial intelligence error correction processor 28. In the preferred embodiment of the invention, these various processors are implemented through corresponding computer programs which, when executed, perform the respective processes. In an alternate embodiment of the invention, as is shown in FIG. 1, the forms definition processor 86, the scanner processor 23, the buffer 40, the forms recognition and field extraction processor 24, the character recognition processor 26 and the artificial intelligence error correction processor 28, may each be separate processors connected together by the local area network (LAN) 20. In order to facilitate an understanding of the invention, the separate processor embodiment shown in FIG. 1 will be described first.

The local area network (LAN) 20 interconnects the forms definition processor 86, the scanner processor 23, buffer 40, forms recognition and field extraction processor 24, character recognition processor 26 and artificial intelligence error correction processor 28, to the host computer 34. Also connected to the LAN 20 is the data base error correction processor 30 and the manual verify and correction processor 32. In addition, an additional image capture facility buffer server 40' can be connected to the LAN 20. The host computer 34 has connected to it a document image storage 36, a coded data storage 35, and a repair history storage 38.

A document 10 is scanned into the system by means of the scanner 22, forming the document image 10' shown in greater detail in FIG. 2C. The document image 10' is a bit map representation of the image of the hard copy document 10. The scanner 22 outputs the document image 10' over the local area network 20 to the forms recognition and field extraction processor 24. A copy of the document image 10' can also be transferred to the host computer 34 and a temporary indexing identity can be assigned to the document image 10' so that it can be temporarily archived in the document image storage 36.

The forms recognition and field extraction processor 24 will include a library of master form definitions of forms which are to be processed by the system. The model of a form consists of a form pattern and a description of each field contained on a form. The form pattern is a set of characteristics that are used to distinguish one form type from another. The field description consists of the location of the field on the form expressed in Cartesian coordinates, an acceptance threshold for character recognition, identifying and field specifying information. A data field location can be expressed in the model by two points that describe the opposing corners of a rectangle. The rectangular area may be called a mask.

When the document image 10' is input to the forms recognition and field extraction processor 24, the image is analyzed to identify the form so that the appropriate master form definition data can be accessed. Several methods can be used for form recognition. One method matches the form number which may be typically printed on the document as a bar code. A second method compares the layout or geography of the forms text and lines which may differentiate form types. A third method relies on the horizontal and vertical lines of the form. Once the document image 10' for the form is characterized, the corresponding master form definition data can be accessed which defines the coordinates for the respective fields, the names of the fields, and the code page for each respective field in the form. The principles of operation of the forms recognition and field extraction processor are described in the co-pending U.S. patent application to Casey and Ferguson, cited above. The principles of operation for forms recognition by recognizing bar code images are further described in the U.S. patent to P. Somerville, cited above.

When the scanner 22 scans in the document 10, the scanner processor 23 can perform some front-end operations such as re-scaling and compression of the image into an image file to which is assigned a file address. The image file of the document image 10' can be temporarily buffered in the buffer 40 or alternately in the buffer server 40', accessible under an assigned address. Alternately, the scanner processor 23 can output the document image 10' directly to the forms recognition and field extraction processor 24.

A document image file pointer 60 which enables accessing the document image 10' from the buffer 40 or from the buffer server 40'. The example scanned form image 10' of FIG. 2C has six data fields and one form number field. The form number field 11' contains a bar code representation of the identity of the form, which is an insurance claim form. The first data field is field 14' which is the last name field. The second field 16' is the first name field. The third field is 12a' which is the state field. The fourth field 12b' is the address field. The fifth field 44' is the signature field and the sixth field 12' is the serial number field. Note that the first through fourth fields and the sixth field contain images of alphanumeric characters whereas the fifth field 44' contains the image of a signature.

In the example of FIG. 2C, the form type will be recognized from the bar coded form number in field 11'. The skew and offset of the form is measured, as it was scanned into the system. Skew and offset values 62 are important in that they must be combined with the pre-specified coordinates of each field on the form in order to locate the actual position of the fields on the scanned form image 10'.

The field extraction process starts by accessing the master form format 10F which includes the field coordinates for the fields on the form 10'. The master form format 10F is shown in FIG. 2A. The data representing the coordinates of each respective field on the form are pictorially represented in FIG. 2A, which depicts the master form 10F. Field 11F is the form number field, field 14F is the last name field, and it is bounded by a boundary 13. Field 16F is the first name field and it is bounded by a boundary 17. Field 12aF is the state field. Field 12bF is the address field. Field 44F is the signature field, and field 12F is the serial number field. These fields shown in FIG. 2A are the pictorial representation of coordinate data which is provided in the master form definition data set corresponding to the insurance claim form in this example.

FIG. 2B shows additional information which is included in the master form definition for the master form 10F shown in FIG. 2A. FIG. 2B depicts a master machine generated data structure (MGDS) 50M. The fixed form data 65 is included in the master MGDS 50M, such as the form name "claim," the number of fields and other like information such as is shown in the form information FI which is depicted in FIG. 7A. Also included in the fixed form data 65 of the master MGDS 50M of FIG. 2B is the page information PI for each page of the form. In the example shown herein, a single page form is employed. Fixed form data for a page would include for example the page number. Also included in the master MGDS 50M is fixed field data 64 for each of the six data fields in the master form 10F of FIG. 2A. Each field on the form is represented by a field data segment, such as field data segment 52M in FIG. 2B which corresponds to the first data field 14F in FIG. 2A. The field data segment 52M includes fixed field data 67 such as the field coordinates 64. Shown in FIG. 2B are the coordinates X1 and Y1 for the upper left-hand corner and X2 and Y2 for the lower right-hand corner of each rectangular field of the master form 10F of FIG. 2A. Also included in the fixed field data 67 is the field name, for example for the field data segment 52M corresponding to the last name field 14F of FIG. 2A, specifies that the field name 68 is "last name." Also included in the fixed field data 67 of FIG. 2B is the field type 70. For example, the field data segment 52M of FIG. 2B has a field type "A/N" which corresponds to alphanumeric.

Other field data 67 which can be included is shown in the field information depicted in FIG. 7C. The master MGDS 50M shown in FIG. 2B is one example of how the master form definition data can be organized and stored in the forms recognition and field extraction processor 24. The forms recognition and field extraction processor 24 will organize the fixed form data 65 for the form information FI and the page information PI and it will organize the fixed field data 67 for each respective field data segment 52M, etc. into a master MGDS 50M which it will transfer to the character recognition processor 26. Prior to such transfer, additional data will be added which is developed by the forms recognition process steps 100 through 103, and in particular the information which will be added is the skew and offset data 62 for the form image 10'.

Additional spaces can be allocated in the master MGDS 50M of FIG. 2B, for information which will be added at later stages in the recognition process. For example, the form return FR field 72 can have space allocated, optional document image file pointer 60 and optional extracted image file pointer 74 can be allocated. The coded data portion 75 can be added, among others. Each of these allocated fields in the MGDS 50M will be empty until they reach the processing stage in the system where the corresponding data is generated in the character recognition repair of the form.

The field extraction process computes the field locations for each field from the field coordinates 64 and the skew and offset values 62 provided in the master MGDS 50M. Field coordinate values 64 are provided for the first field for the first field data segment 52M, the second field data segment 54M, the third field data segment 56M, the fourth field data segment 12bM, the fifth field data segment 44M and the sixth field data segment 12M.

The field extraction process extracts the field images 10" from the document image 10' using the field extraction process. Reference can be made to FIG. 3 which illustrates an example field extraction process. FIG. 3 shows the field image 16' for the first name field as it appears on the document image of FIG. 2C. The field image 16' is shown with the surrounding box 17, the characters 18 and the spurious lines 19 and 19a. In the process of field extraction, the image of the box 17 is removed. In addition, in the process of extraneous line removal, the image of the extraneous line 19a is eliminated, because a portion of it lies outside the pre-defined area of the field 16'. However, for this example, the extraneous lines 19 have not been removed from the image 18 of the characters in the field 16', as can be seen in the resulting extracted field 16" of FIG. 3. The extracted field image 16" will appear on the extracted field images 10" of FIG. 2D for the form.

An additional example of spurious lines which remain in the extracted field is shown for the state field 12a' in the form image 10' of FIG. 2C, whose corresponding extracted image 12a" still possesses the spurious lines overlapping the letter L in the state abbreviation for the state of Florida "FL."

Then the field extraction process assembles the fixed form data 65, for example the form name 66, etc., along with the fixed field data 67, for example the field name 68, type 70, field coordinates 64, etc., into the master MGDS 50M shown in FIG. 2B. Then variable form data is inserted into the master MGDS 50M. For example, the form return code 72, which currently has a value of "zero," the document image pointer 60, which is the pointer address for the file of the document image 10', the extracted image pointer 74, which is the pointer address for the file containing the extracted image 10", the skew and offset value 62, and other data currently available at this stage in the forms recognition and field extraction processor 24.

Then the field extraction process outputs the MGDS message 50A shown in FIG. 1A, to the character recognition processor 26. If this were the multi-task embodiment of these processes in the intelligent forms processor 25 of FIG. 5A, then the transfer of the MGDS message 50A would be to a commonly accessible partition in the memory of the processor 25. Alternately in the multiprocessor LAN embodiment of FIG. 1, the MGDS message 50A is transferred over the LAN 20 to the character recognition processor 26.

The process then outputs the extracted images file 10", The extracted field images file 10" can be placed in a file whose address is referred to by the extracted image pointer 74, and the extracted image 10" can then be stored in the buffer 40 or the buffer server 40'. Alternately, the extracted field images 10" can be transferred directly to the character recognition processor 26.

FIG. 1A shows a more detailed illustration of the MGDS 50A as it is output from the forms recognition and field extraction processor 24. In particular, the MGDS 50A shown in FIG. 1A is depicted for the first field data segment 52A and the second field data segment 54A corresponding to the first two out of the six fields of the form image 10' shown in FIG. 2C.

The forms recognition and field extraction processor 24 will generate a first stage MGDS data structure message 50A which is shown in greater detail in FIG. 1A. A specific format for the form information in the MGDS 50A, is shown in FIG. 7A. The form return code parameter has a length entity with a value of six, an ID entity and a data entity. The data entity is two bytes long, the ID entity is two bytes long and the length entity is two bytes long, and thus the value in the length entity is six, which represents the total number of bytes in the parameter. The MGDS groups related parameters together to allow the entire group of associated parameters to be passed and parsed easily. The parameters are grouped by specifying a parameter that is intended to encompass several sub-parameters. Such an encompassing parameter or container object, for example the field information parameter, is shown in FIG. 7A to have a length entity, an ID entity and a data entity. Included in the data entity is an arrow which indicates that the encompassing parameter's data is the group of parameters that follow within the length specified for the encompassing parameter in its length entity. Note that the lengths and IDs are hexadecimal values.

The form information FI which is included in the beginning portion H of the MGDS 50A, includes the parameters shown in the FIG. 7A. The MGDS parameter is an encompassing parameter which encompasses the entire MGDS 50A. The MGDS version parameter states the version of MGDS being used. The form return code parameter will indicate if errors were encountered when processing the image. If the return code indicates errors existed at the field level, the rejected character and suspicious character return codes must be checked to determine the exact error. The form return code is the main indicator to determine if reject processing is required on a document image. Negative return codes will indicate a processing error occurred at the form or field level so that the form may actually be mis-identified. Positive return codes will indicate the number of rejected and suspicious characters that were found on the form for all of its fields. This return code can be reset to zero after error correction has successfully taken place.

The when-to-convert parameter indicates if the application creating the MGDS, that is the forms recognition and field extraction processor 24, has converted the character data in the MGDS to the appropriate host code pages. A parameter value of zero indicates that the application creating the MGDS has left the character data in the original ASCII code pages in which it was created and the numeric data appears in the workstation byte order where the hexadecimal representation of numerics is read by flipping the bytes. A value of two indicates that the application creating the MGDS converted the character data to the appropriate host EBCDIC code pages and the numeric data replica appears in the host byte order where the hexadecimal representation of the numerics is read without flipping the bytes. A value of one requires inspection of the form return code to determine the byte order of the numeric data and whether the character data has been code page converted.

The form class name parameter indicates the name of the form class recognized for the form. This name is defined by the forms recognition and field extraction processor 24 which performs the form recognition operation.

The form name parameter gives the name of the form as it is defined by the forms recognition and field extraction processor 24 performing the form recognition operation.

The general code page parameter is the code page for the unrecognized character flag, the form class name, field names, field associations and field repaired parameters. An assumption is made that all of these items will appear on one code page. If several code pages exist for these different items, the code page of the unrecognized character flag will be used.

The unrecognized character flag parameter is used to denote an unrecognized character in the character data buffer. The number of fields parameter indicates the number of fields that data will be returned for in the MGDS.

The form code page parameter is used for all the data on the form. If all the data on the form uses the same code page, this parameter will show that code page. If different code pages are used on the form, this field will not be returned and the field code page parameters will indicate the code pages in each field. As data is translated from code page to code page and stored back in the MGDS, this parameter should reflect the current code page for the forms data.

The host form code page parameter is the code page that the host has specified for all character information retrieved off the image. Characters should be converted to this code page before the information is submitted to the host for final processing. All character information that is associated with the form code page parameter will be translated to the host code page based upon the when to convert parameter value.

The host code page parameter indicates the host code page to which the field information for a specific field code page should be translated. This parameter maps one-to-one with the field code page parameters when they are present to indicate the host code page to which the data in the specific field should be translated.

The page information parameter is an encompassing parameter that encompasses information about each page of a document. This parameter does not encompass information about fields on each page.

The field information parameter is an encompassing parameter for a field data segment and is used to group all of the information that is returned for each respective field on a page of the form. There is no information in the parameter other than the length of the entire set of field data for each field.

Page information formats are shown in FIG. 7B. The page number parameter provides a page number for information that appears in the page information encompassing parameter. The page resolution parameter provides that the resolution of a specific page indicated by the page number parameter located in the page information parameter. The page orientation parameter provides the orientation of a specific form page. The values indicate no rotation or a positive clockwise rotation of 90, 180 or 270 degrees.

FIG. 7C illustrates the detailed format of field information. The rejected character return code parameter indicates rejected characters were encountered during the character recognition process. This parameter will not be filled with data until the character recognition processor performs its operation. The number in this field indicates the number of rejected characters that were encountered in the field. If the number is negative, it indicates an error was encountered while processing the field.

The suspicious character return code parameter will indicate suspicious characters were encountered during the character recognition process by the character recognition processor 26. The number in this field indicates the number of suspicious characters that were encountered in the field. The field association parameter is used to associate the field with the host fields. This is the ID the user will enter into a forms definition utility to indicate its association value and is provided by the forms recognition and field extraction processor 24. This field differs from the field name parameter because it is used to describe the field in terms of an application use rather than in terms of the field as it appears on the form. For example, this field may contain indexing information which is significant to a host application.

The field name parameter is the field description that will be used to describe the field during error correction and data entry. The field form page parameter is the form page on which the field appears.

The field coordinates parameter is filled out by the character recognition processor 26, with the coordinates of the field used for highlighting the field and further processing of the field in subsequent repair stages. These coordinates are the upper left and lower right coordinates of a rectangle enclosing the field and are based on a coordinate system with the 00 coordinate located in the upper left corner of the image. Each of the four coordinate values uses four bytes, that is the X left, Y bottom, X right and Y top.

The coded data parameter shown in FIG. 7D, is an encompassing parameter that is used to group all character information having the same code page in each field. Since multiple code pages may be used in each field, the coded data parameter will group the code page and the character information. Character information will not be supplied until the character recognition processor performs its operation. There is no information in this parameter other than the length of code page and character information. The presence of the coded data parameter is mutually exclusive with the presence of the field existence parameter. Both parameters may not exist for the same field at the same time. The field existence parameter denotes whether the field contains data or not and can be used for example a check box field.

Reject character information parameter shown in FIG. 7E, is an encompassing parameter which will be added by the character recognition processor 26, and is used to group all information about a rejected or suspicious character. There is no information in this parameter other than length of the reject information.

Optionally, an image data parameter (not shown) may be included in the MGDS message 50A, provided by the processor 24. After the processor 24 has performed its field extraction operation, the cleaned-up image of the field can have its bit map arranged in serial order and optionally compressed and loaded into MGDS 50A.

Figure 6A:
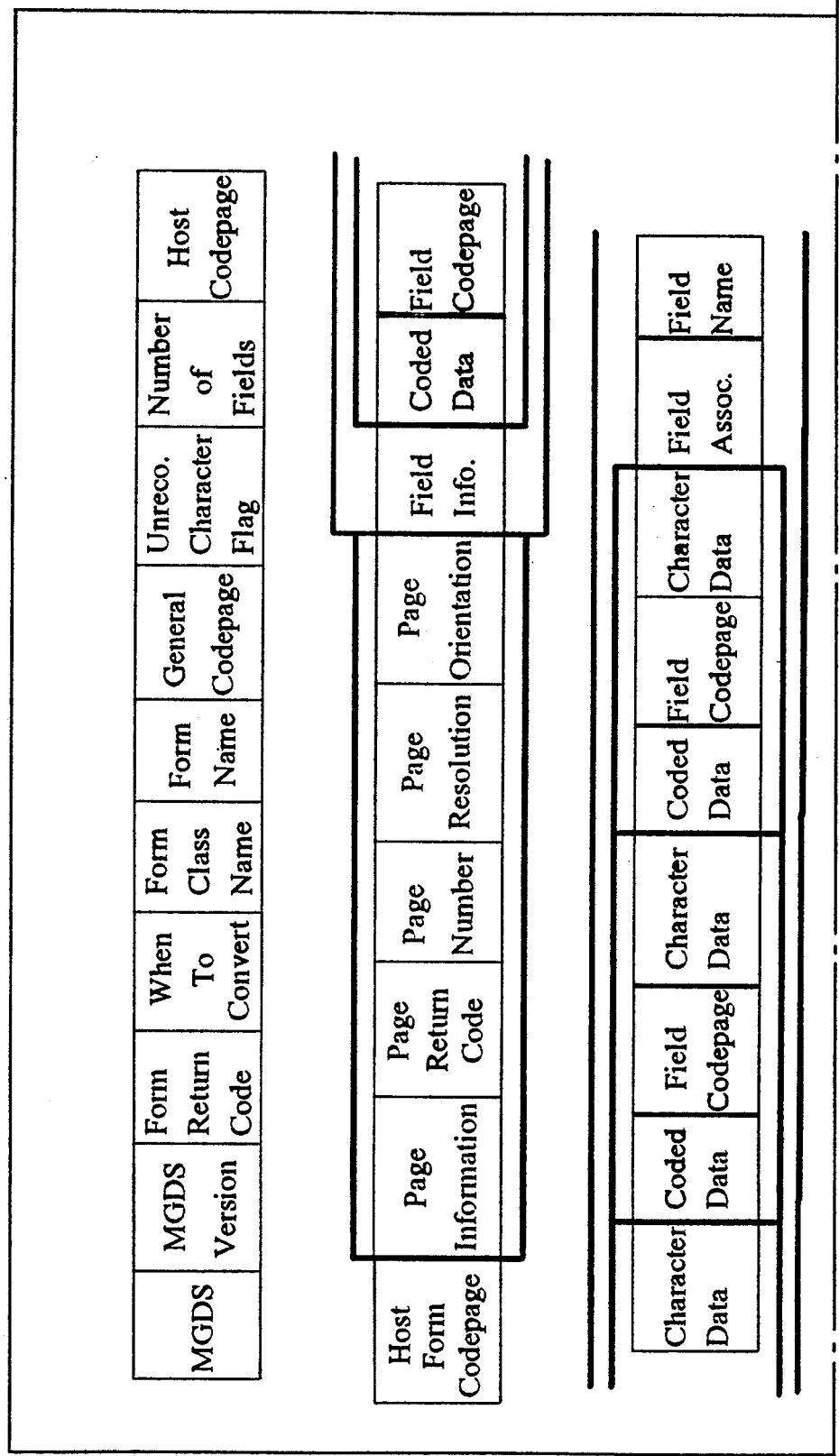
FIG. 6A and FIG. 6B, illustrates the relationships between machine generated data structure (MGDS) parameters.
Figure 6B:
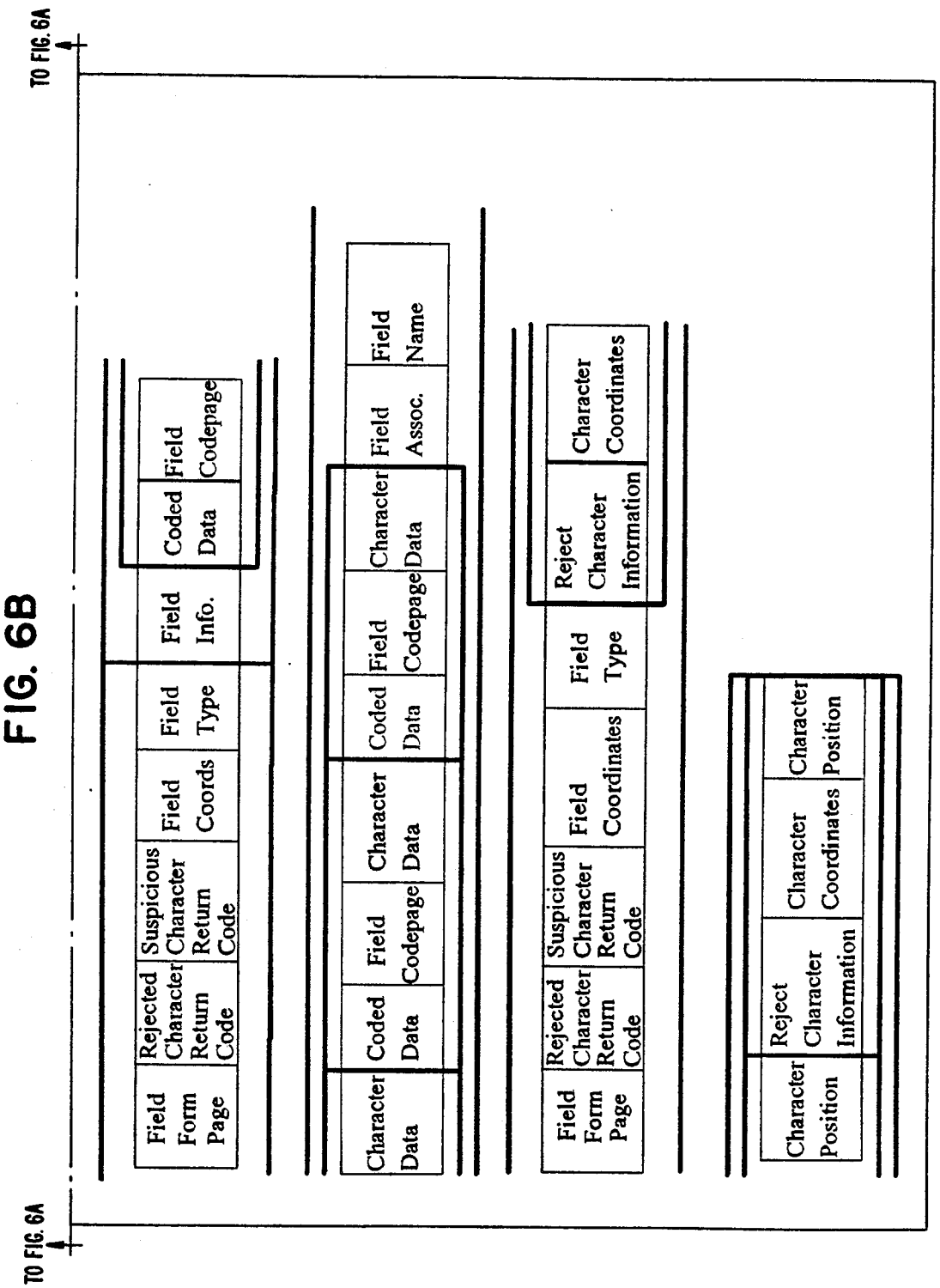

Reference to FIG. 6 will illustrate the relationships among the various MGDS parameters in an MGDS message structure. It is seen that form information is a part of the beginning portion H for the MGDS 50A. That is followed by the page information which is clustered together as shown in FIG. 6. This is then followed by several field information segments, each field information segment corresponding to one of the fields of the subject form. Within the field information segment will be one or more coded data segments, each coded data segment corresponding to a portion of the field characterized by a single code page. If the entire field is characterized by a single code page, then there will be a single coded data segment for the field. Also included with the field information will be any reject character information which may be produced by the character recognition processor 26.

The character recognition process performed by the character recognition processor 26 will operate upon the image 16″ of FIG. 3 to produce the character string 42 "Ja*n."

Figure 2D:
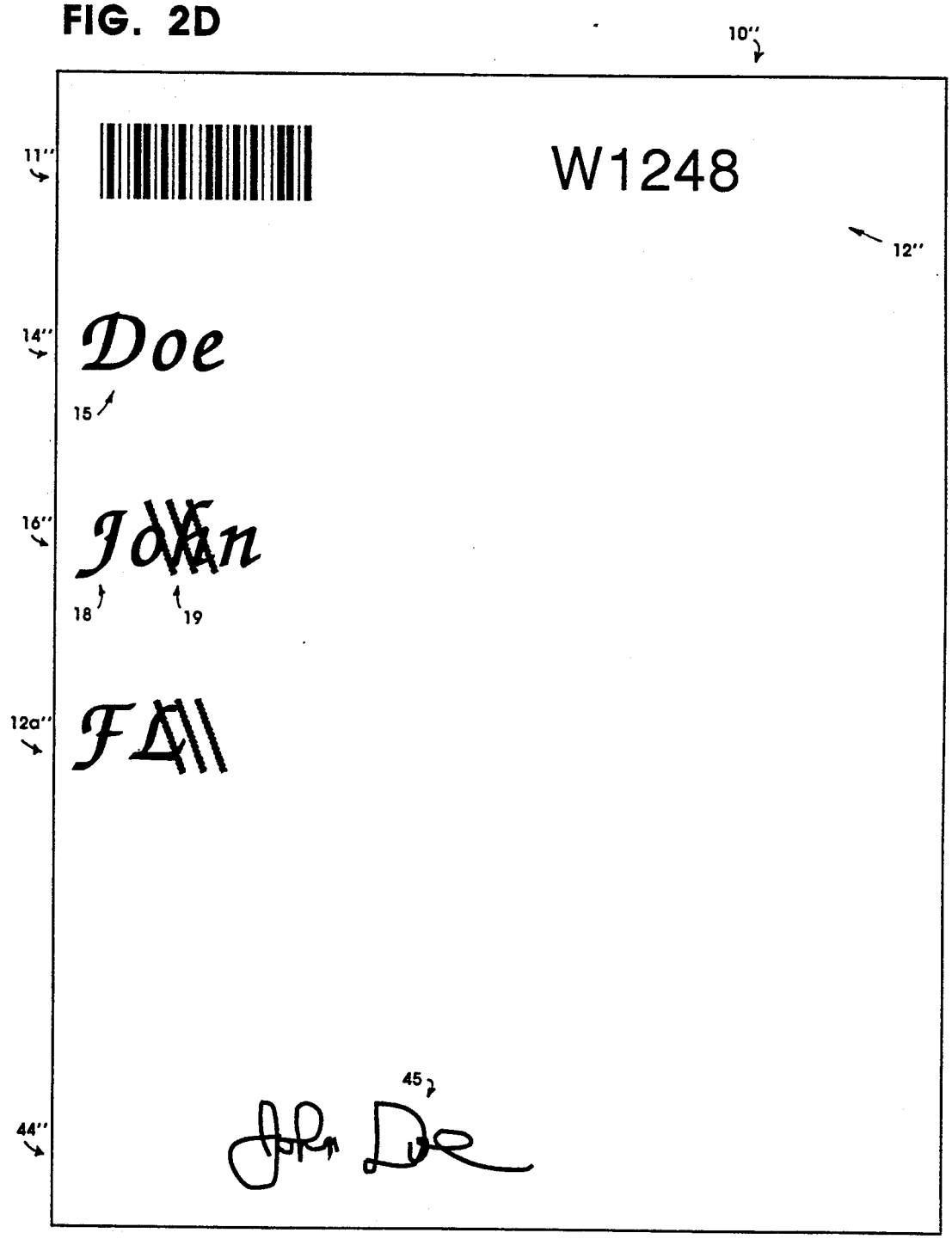
FIG. 2D illustrates the extracted field images 10" from the scanned form image 10' of FIG. 2C.

The character recognition process inputs the MGDS message 50A, as is shown in FIG. 1A. Then processor 26 inputs the extracted field images file 10″, as shown in FIG. 2D.

Then a loop begins for each respective field data segment. It gets each respective field data segment from the MGDS message 50A shown in FIG. 1A. The first field data segment 52A for the last name field 14″, is processed first. Next the loop will get field data segment 54A from the MGDS message 50A, for the second field 16″. The example herein focuses on the second field which is the first name field and its field data segment 54A.

Then, processor 26 gets the field coordinates 64 from the field data segment 54A. Then it gets the field type information 70 from the field data segment 54A. Field type information 70 can include a wide variety of character styles which can be specified as the type expected for the field. If a particular form is usually filled out by hand, then hand printing would be indicated in field type information 70. Machine printed numerals or Kanji, Hebrew or Cyrillic alphabets are other character styles which can be specified as the expected field type 70.

Then the type of character recognition procedure is selected based upon the field type or other characteristics expected for the characters whose images appear in the field 16″. The type of character recognition procedure conducted for a particular field can be optimized for performance or accuracy if information is available on the type of characters expected for the field. For example, if the field type information 70 indicates that machine printed Roman alphabetic characters will be present in the field, such as for an ASCII code page, then a standard OMNI font recognition procedure can be used. Alternately, if the field type information 70 indicates that the field is strictly a numeric field using Arabic numerals, then a numeric recognition procedure can be used which will have better performance since ambiguities in recognition will be resolved in favor of numerals as opposed to letters for such a field. Alternately, if field type information 70 or code page 71 indicates that the field is expected to contain Kanji Japanese characters, then a double byte recognition procedure must be employed. Alternately, if the field type information 70 indicates that it is an image field, then no character recognition will be performed, but instead the image itself will be extracted and passed through to the field data segment. Alternately, if the image is specified as a signature, a cursive character recognition process can be applied (not shown). Also, a signature verification process can be applied (not shown).

Then an extracted field image bit map 16″ is obtained, as is shown in FIG. 2D. Then the character recognition procedure is performed on the image 16″.

The image created by the data extraction process provides a clean image of the data to be recognized in the character recognition processor 26. This is done field by field, with the characters in each field extracted as a single image block. Before a field image can be recognized, it must be segmented into individual character images. These are recognized in turn by a character classifier. Segmentation will identify the pitch or distance from the character to character, separate touching characters and merge broken characters. It will identify the skew of the typing, if any, and other idiosyncrasies of the particular string image in the field. The character recognition classifier accepts a single character pattern as in input and returns an identification symbol and ASCII or EBCDIC code. When documents arrive from many different sources as is usually the case with typed data on forms, a library of tree logics is needed, one for each font that will be encountered. Fonts having size characteristics that match those of the printing are tried for recognition and each classifier provides its own estimate of the accuracy of its own recognition. These estimates are evaluated to select the best classifier for reading the remainder of the image. In addition, a list of prototype patterns can be output which are representative of the input having the property that no two prototypes match one another and that every input pattern matches some prototype, each prototype being defined as a cluster. The cluster consists of all patterns that match it. Cluster information can be output by the character recognition processor for use by subsequent stages of repair.

Reference to FIG. 1B will illustrate some of the information that can be added by the character recognition processor 26 to the MGDS message 50B. The character data buffer B would be loaded with the recognized character string which includes the fully recognized characters "J" and "n," the suspicious character "a" and the position of the reject or unrecognized character which is indicated by an asterisk "*." In addition, first reject character information S will be placed in the reject character information segment identifying the character position, the character coordinates, a second guess character and a character certainty. The character position for the first character is indicated as "0," the second character is indicated as "1" and so on. Thus, character position for the suspicious character "a" is indicated as "1." The character coordinates are provided for the location in the field image of the suspicious character "a." In addition, the character recognition processor 26 will have formulated several candidate alternate characters which have a lesser certainty value. The next highest certainty value corresponds to the character "o" and this is the second guess character which is provided in the second guess character parameter of the reject information segment S. In addition, the character certainty of 50 percent, in this example, is also loaded into the reject character information segment S. A second reject character information segment R is provided for the reject character position "*." The character position is indicated as two, indicating it's the third character position, and the coordinates for that character position are provided for the field image. This information is loaded into the MGDS message 50B of FIG. 1B.

Returning now to the character recognition process, it generates the coded data 42 using the selected recognition procedure as indicated in FIG. 3. Then the unrecognized characters 31 are flagged as shown in FIG. 3, and the character return code RC is incremented by one and the form return code FR is also incremented by one, as is shown in FIG. 1B.

Then the character recognition process identifies as "suspicious" any character position 21, as shown in FIG. 3, that is recognized with a certainty level which is below an established threshold. The suspicious return code SC is incremented by one and the form return code FR is also incremented by one, as is shown in FIG. 1B.

Then the coded data 42 consisting of the recognized characters "J" and "n," the suspicious character "a," and the reject flag "*" are loaded into the character data buffer B of the field data segment 54B, shown in FIG. 1B.

Then, the field data segment 54B is augmented with a sub-segment S for the suspicious character error data, and sub-segment S is loaded with the location coordinates 21 of the suspicious character, as is shown in FIG. 1B.

Then the second guess character 29 for the suspicious characters are loaded into the sub-segment S, as shown in FIG. 1B. In this example, the second guess character 29 is a "o." Then the certainty value 61 for the suspicious character is loaded into the sub-segment S of FIG. 1B. In this example, the certainty of the first guess 27 character "a" is 50 percent and this value is value 61 for the certainty.

Then the field data segment 54B is augmented with the sub-segment R for the rejected character error information, which is loaded with the location coordinates 31 of the reject character position, as is shown in FIG. 1B. Then determine if another field data segment is to be processed.

Then determine whether there are additional field data segments to be processed for additional fields in the extracted field images 10" of FIG. 2D. If there are, then the loop goes back. Alternately, if there are no more field data segments to be processed, then the process outputs the MGDS message 50B, which is shown in FIG. 1F(B).

FIG. 1F(B) shows the character buffer B for the coded data for each field segment of the six fields in the form of FIG. 2D. The first field segment 52 has the character string "Doe" in buffer B. The second field segment 54 has the character string "Ja*n" in its buffer B. The third field segment 56 has the character string "FA" in its buffer B. The fourth field segment 12b has its buffer B empty since there was no corresponding image information in the field 12b' of the form image 10' of FIG. 2C. The fifth field data segment 44 has the signature image 45 in its field image portion. The sixth field data segment 12 has its buffer B containing the string W1248. The contents of each of the character buffers B in each respective field data segment is the best current estimate of the correct alphanumeric string which corresponds to the image contained in the respective field of the extracted field images 10" of FIG. 2D.

The coded data information format shown in FIG. 7D depicts the field code page parameter which is the code page used for each specific character string in the field. Whenever code page changes in a field, the field code page parameter will precede the character string that uses it. If all the code pages on the form are the same, then the field code parameter need not be used and the form code page parameter will indicate the code page that should be used for all character data on the form.

The character buffer parameter B is also shown in FIG. 7D and that is the location for storage of the character string that uses one code page. If the field contains no characters, but the field was indicated to be a mandatory field by the processor 24, the rejected character return code will indicate no value was an error. The character buffer is the repository for the current corrected value of the character string representing the field. At each sequential stage of field repair, the highest probability character string representing the field will be loaded into the character buffer B.

The reject information format is shown in detail in FIG. 7E. The reject character information encompassing parameter encompasses the character position parameter which identifies the position of the character in the string of characters for the entire field. This is required so that an association between the character value and the image character can occur at the respective repair stations. This position indicates the character position in the field and not the number of bytes preceding the character.

The MGDS message 50B is transferred over the LAN 20 to the artificial intelligence error correction processor 28, to accomplish a first repair of those fields whose field segments have an error. The correction processor 28 can be a part of the character recognition processor 26 in some embodiments. An example of an artificial intelligence error correction process would be the lexical testing of the character strings produced by the character recognition processor 26. Generally the data contained in a particular field of a form are constrained in the sense that not every character string is permissible. An amount field is typically filled with numeric data and a name field is typically filled with alphabetic data. Such constraints are useful for character recognition correction. For example, if a particular field is only numeric, then a comparison of suspicious characters in the field with numeric characters will be appropriate. An example of this would be a zip code field where one or more of the numeric characters in the image of the zip code field were either suspicious or not read. If the state or especially the state and city fields of the form were read without unrecognized characters, then a lexical analysis can be performed using the data base equivalent of a zip code directory to fill out the most probably numeric values for the rejected or suspicious characters in the zip code field. For particular types of fields, not only digits, but also letters and punctuation can be inferred from positions or the context of the misread character. For example, if a particular field is a state field, and there is a misread character in the field, a list of the 50 states can be used in a lexical analysis, to find the highest probability match for the characters that are accurately recognized, thereby enabling the inference of the values for those characters which are rejected or suspicious.

Still another application, and one used in the example herein, is common English given names or first names. The MGDS 50B is input to the artificial intelligence error correction processor 28, and the first name field 16'' contains the letters "John" which is the character image 18. The output character string 42 of Ja*n" from the character recognition processor 26, will be processed in the error correction processor 28 using lexical analysis. The corresponding second guess character "o" for the second character in the string 42 will also be tested using a lexical analysis to test "Jo*n." The lexical analysis example is of given names having four letters with the first letter being "J" and the last letter being "n." A lexical analysis will draw upon a list of candidate names such as "Joel," "Jack," "John," "Jake," "Jane," "Jean," "Jill," "Joan," "Judy," and "June." The example of the lexical analysis performed by the artificial intelligence error correction processor 28, requires that the input MGDS message 50B supply some information in connection with the field, to enable the first repair to take place. The information supplied is the character string from the character data buffer B of the string 42 "Ja*n," and the second guess character for the second character position, namely "o." The artificial intelligence error correction processor 28 will determine from its lexical analysis that the string "Joan" has a 50 percent certainty and the string "John" also has a 50 percent certainty.

The artificial intelligence correction process inputs the MGDS message 50B. Then a loop begins in which the next field data segment has its suspicious character return code SC and its reject character return code RC examined to determine if there are any suspicious characters or reject characters for that field. As can be seen for the first field data segment 52B of FIG. 1B, the character recognition processor 26 determined that there were no suspicious characters or reject characters. Therefore, go to the next field data segment 54B to determine if there are any suspicious characters or reject characters for that field. As can be seen in FIG. 1B, the field data segment 54B indicates that there are a suspicious character SC return equal to one and a reject character RC return code equal to one.

Figure 1C:
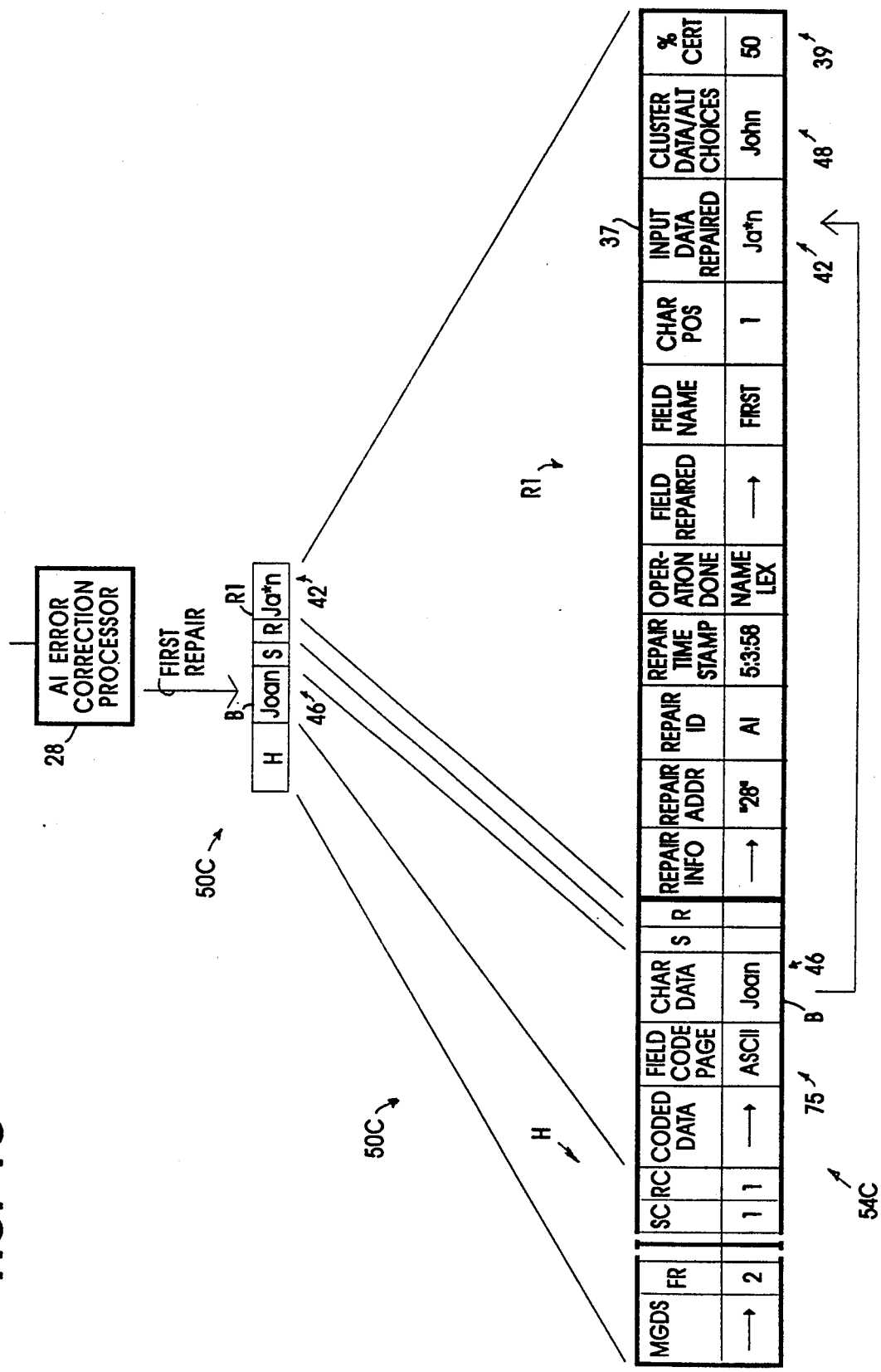
FIG. 1C illustrates the MGDS 50C including the first repair segment R1 output from the artificial intelligence error correction processor 28.

A first repair segment R1 is appended to the MGDS message 50B as shown in FIG. 1B, forming the MGDS message 50C, now shown in FIG. 1C. The first repair segment R1 provides space for the compilation of a history of the repair which is about to be made by the artificial intelligence correction process 28A on the contents of the character data buffer B of the field data segment 54B in FIG. 1B. The first repair segment R1 will include data such as the repair address for the artificial intelligence error correction processor 28, the identity of the type of correction, the repair time stamp, the operation done, and then information on the field repair itself, such as the field name, character position repaired, and other information which will be explained below.

The process then gets the coded data 42 "Ja*n" from the data buffer B of the field data segment 54B of FIG. 1B.

Then for this example, a determination is made as to which type of artificial intelligence error correction process should be employed. This of course would depend upon the type of information contained in the respective field. For example, the first name field 16'' contains first names and it would be appropriate to perform a lexical analysis of the similarity of the coded data 42 "Ja*n" with a lexicon of conventional first names. Alternately, if the field is for the abbreviation of state names, such as the field 12a'', then it would be more suitable to apply a lexical analysis of the similarity of the character string 42' which is "FA" of the third field data segment, to a lexical analysis of conventional state names and their abbreviations.

Accordingly, determine if the field name 68 for the field data segment 54B, is the "first name," and if it is, then the "first name" lexical process is executed. This occurs by comparing the coded data with the list of common first names. Then the lexical check is performed.

Alternately, if field name 68 is not "first name," but instead if the field name 68 is "state," then execute the "state abbreviation" lexical procedure. This is done by comparing the coded data with the list of state abbreviations. Then the lexical check is performed.

The lexical check of the coded data 42 "Ja*n" includes the suspicious character 27 which is "a" and it computes a first certainty value using the selected lexical procedure. In this case the selected lexical procedure is the "first name" lexical procedure described above.

Then get the second guess character 29, which in this case is the letter "o" shown in FIG. 1B, from the field data segment 54B, and form a second guess coded data 46, in this case "Joan."

Then do a lexical check of the second guess coded 46 and compute a second certainty value using the selected lexical procedure, which in this case is the "first name" lexical procedure.

Then if the second certainty for the second guess coded data 46 is greater than the first certainty for the first guess coded data 42, coded data 42 "Ja*n" is transferred from the data buffer B in the MGDS 50C of FIG. 1C and is placed in the input data repaired portion 37 of the first repair segment R1. This is followed by loading the second guess coded data 46 "Joan" into the data buffer B of the field data segment 54C shown in FIG. 1C. In this manner, the best estimate of the character string representing the field 16'', is contained in the character data buffer B of the coded data portion 75 of the field data segment.

Then the certainty 39 of the coded data 46 representation of the image in the field 16'' is loaded into the first repair segment R1 as is shown in FIG. 1C. In this case, the certainty that the character string "Joan" represents the field 16'' is 50 percent.

Then load cluster data or alternate choices 48 for the coded data into the first repair segment R1. The artificial intelligence error correction processor 28 has determined that the alternate choice for the coded data representation of the field 16'' is the character string "John" 48 and this is placed into the first repair segment R1, as is shown in FIG. 1C.

Then the repair processor address "28" and the time stamp for the repair at the processor 28 are loaded into the first repair segment R1.

The process then determines if another field data segment is present. In this case, the next field data segment in the MGDS 50B is the field data segment 56B corresponding to the state field 12a''. The artificial intelligence correction process 28A determines that the field name 68 is "state" and it therefore executes the "state abbreviation" lexical process which results in a determination that the character string 46' which is "FL" is the more likely representation of the field 12a''. Therefore the coded data 42' which is "FA" is loaded into location 37 of the repair segment R1' of FIG. 1H, and the second guess coded data 46' which is "FL" is loaded into the character data buffer B of the coded data portion 75'' of the field data segment 56C. In this manner, the character string which is the most likely representation of the image for the state field 12a'', is present in the character data buffer B of the coded data portion 75'' of the field data segment.

When there are no more field data segments for analysis, then the process outputs the MGDS message 50C shown in FIG. 1F(C). The MGDS message 50C shown in FIG. 1F(C) includes the six field data segments. In addition to the six field data segments, there are two repair segments, R1 which pertains to the second field for the first name and the repair segment R1' which pertains to the third field for the state. The first field data segment 52 has its buffer B unchanged from the MGDS 50B. The field data segment 54 for the MGDS 50C, has its buffer B changed to the new character string "Joan." The third state field segment 56 in MGDS 50C has its buffer B changed to the character string "FL." The fourth, fifth and sixth field segments 12b, 44 and 12 respectively, remain unchanged in MGDS 50C, over that in MGDS 50B. The additional repair segment R1 which repaired the first name field, has its buffer 37 containing the character string "Ja*n." The second repair segment R1' which repaired the state field, has its buffer 37 containing the string "FA." It is seen that a repair history is accumulating in the MGDS 50C in the form of the presence of the repair segments R1 and R1'. In addition, it is seen that the best estimate of the character string representing each respective field in the extracted field images 10'' of FIG. 2D, is present in each respective character buffer B for each field data segment in the MGDS 50C.

In FIG. 1C, the MGDS message 50C is formed by the error correction processor 28, using information from the MGDS 50B received from the character recognition processor 26. The MGDS 50C of FIG. 1C will have the repair address for the processor 28 entered into the repair segment R1 which augments the MGDS 50B. The segment R1 also will have the ID of the repair namely artificial intelligence or "AI." Also included will be a repair time stamp which in this case is fifth hour, third minute, 58th second or the day. The operation done will be entered as "LEX," indicating that a lexical analysis has been performed for this first repair. Then, the field repaired encompassing parameter for the MGDS 50C of FIG. 1C, will include the field name which is "FIRST," character position which is the second character or as used herein, "1." The first stage repair carried out at correction processor 28 makes use of first and second choice information included in the input MGDS message 50B from the character recognition processor 26.

It is appropriate at this point to discuss how the preferred embodiment of the invention uses a single intelligent forms processor 25 to execute in multi-task form, the respective processes carried out in the forms recognition and field extraction processor 24, the character recognition processor 26, and the artificial intelligence error correction processor 28.

FIG. 5A shows a detailed architectural diagram of the intelligent forms processor 25. The processor 25 includes a memory 302 which is connected by the bus 322 to the CPU 310, the bulk storage device 312, the display and keyboard 314, and the LAN adapter 316. The scanner adapter 318 connects the scanner 22 to the bus 322. The LAN adapter 316 connects the LAN 20 to the bus 322. In addition, an optional FAX and communications network adapter 320 can couple a fax telephone line to the bus 322 and can connect a data communications network to the bus 322. The CPU 310, can be for example an Intel 386 or 486 data processing unit. The bulk storage device 312 can be a hard disk storage such as a 200 megabyte hard disk storage, or it can be a combination of a hard disk magnetic storage and an optical read-write storage.

The memory 302 will include several computer programs, each of which is a sequence of executable instructions to carry out a process. The memory 302 includes a scanner interface program 23A' which carries out the processes performed by the scanner processor 23, as described above. Also included in the memory 302 is a partition for the buffer 40. Still further, a partition is provided in the memory 302 for the master form format 10F which is shown in FIG. 2A and in FIG. 2B.

The memory 302 provides a partition for the forms definition program 86A' which carriers out the forms definition process 86A of FIG. 4A. The forms definition program 86A' receives a field association list 82, performs the operation specified in FIG. 4A, and produces the master MGDS 50M shown in FIG. 2B.

The memory 302 provides a partition for the forms recognition program 24A'. The partition also includes the field extraction program 24B' which carries out the field extraction process. The result of the execution of the forms recognition program 24A' and the field extraction program 24B' is the production of the extracted field images 10" and the production of the MGDS 50A, as has been described above.

Another partition is provided in the memory 302 for the character recognition program 26A' which carries out the character recognition process. As a result of the execution of the character recognition program 26A', the MGDS 50B is produced. The character recognition program 26A' operates upon the MGDS 50A produced by the forms recognition program 24A' and the field extraction program 24B', to produce the MGDS 50B.

A partition is also provided in the memory 302 for the artificial intelligence error correction program 28A' which carries out the artificial intelligence process. The artificial intelligence error correction program 28A' operates upon the MGDS 50B produced by the character recognition program 26A', to produce the MGDS 50C.

A multi-tasking operating system 304, such as IBM's Operating Systems/2, Extended Edition, can be used in multi-tasking mode to control the multi-task execution of the programs in the memory 302. Alternately, the operating system 304 need not oversee the multi-task execution of the application programs, but instead the application programs can be sequentially executed for processing a particular data field segment in the MGDS.

The provision of a facsimile and network adapter 320 connecting a telephone facsimile line to the processor 25, enables the receipt of facsimile images in lieu of images provided through the scanner adapter 318. Similarly, the connection of the adapter 320 to a data communications network enables the receipt of existing document image files from the network, in lieu of the production of such document image files by the scanner 22.

The MGDS message 50C is output from the AI error correction processor 28 over the local area network 20 to the second repair station which is the data base error correction processor 30. The data base error correction processor 30 contains a data base of customer names used in the particular application running on the host computer 34. The host computer 34, in this example, manages a document image archiving system for insurance forms, for an insurance company. The insurance company will have many insured customers and the list of those insured customers will be contained in the data base error correction processor 30. By comparing suggested character strings in the MGDS 50C which is input to the data base error correction processor 30, a selection can be made of that character string which is the same as the actual name of one of the insured customers in the particular host computer application. In this example, the MGDS 50C is input from the AI error correction processor 28 to the data base error correction processor 30 where there is appended thereto a second repair segment R2. The second repair segment R2 will characterize the second repair performed by the processor 30. In an alternate embodiment of the invention, the data base error correction processor 30 can be combined with the artificial intelligence error correction processor 28 and the character recognition processor 26 in the same processor 25 in a multi-task application.

The data base error correction processor 30 will take the preferred choice character string "Joan" 46 from the character data buffer B and will perform a comparison with the data base containing all of the insured customer names. It is found that there is no match for a "Joan Doe." Then, the data base error correction processor 30 takes the alternate choice 48 "John" received from the MGDS 50C, and applies it in a comparison of insured customer names in the data base. A successful comparison is made finding a "John Doe." As a result of this second repair operation, the contents of the character data buffer B with the string 46 "Joan," is transferred to the input data repair portion 37 in the second repair segment R2. Then, the contents of the character data buffer B is loaded with the repaired value for the character string 48 "John."

The MGDS 50D shown in FIG. 1F(D) has six field data segments and three repair segments. The six field data segments correspond to the six fields present in the extracted field images 10" of FIG. 2D. The buffer B for each respective field data segment of the MGDS 50D contains the character string which is the best current estimate of the image of the characters in the corresponding field of the extracted field images 10". In addition, a character recognition repair history has been constructed in the form of the three repair segments R1, R1' and R2. The presence of these three repair segments assists in the subsequent further analysis of respective field data segments. The presence of these three repair segments also provides an audit trail for improving the overall character recognition process.

Figure 1D:
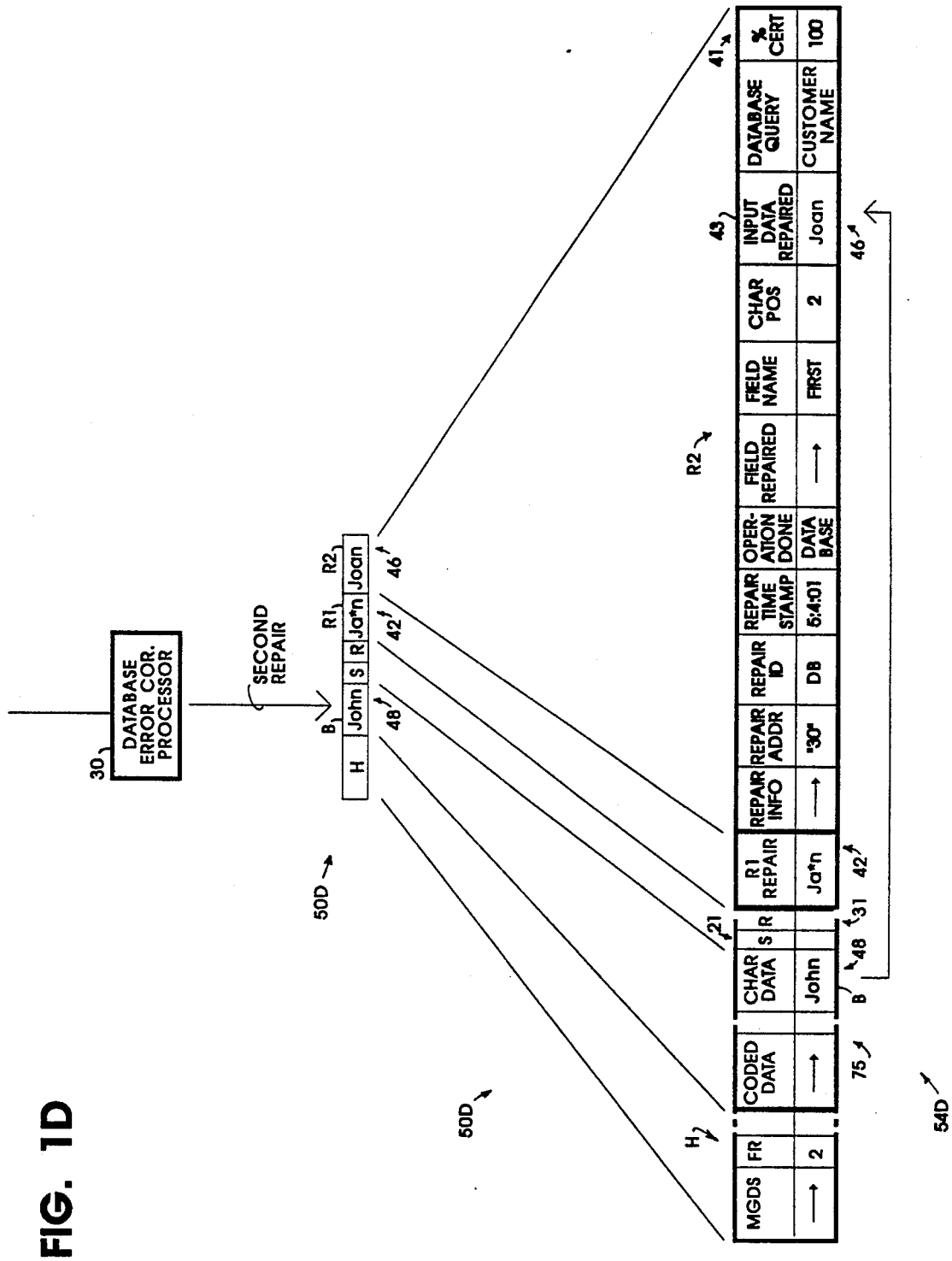
FIG. 1D illustrates the MGDS 50D including the second repair segment R2 output from the data base error correction processor 30.
Figure 1E:
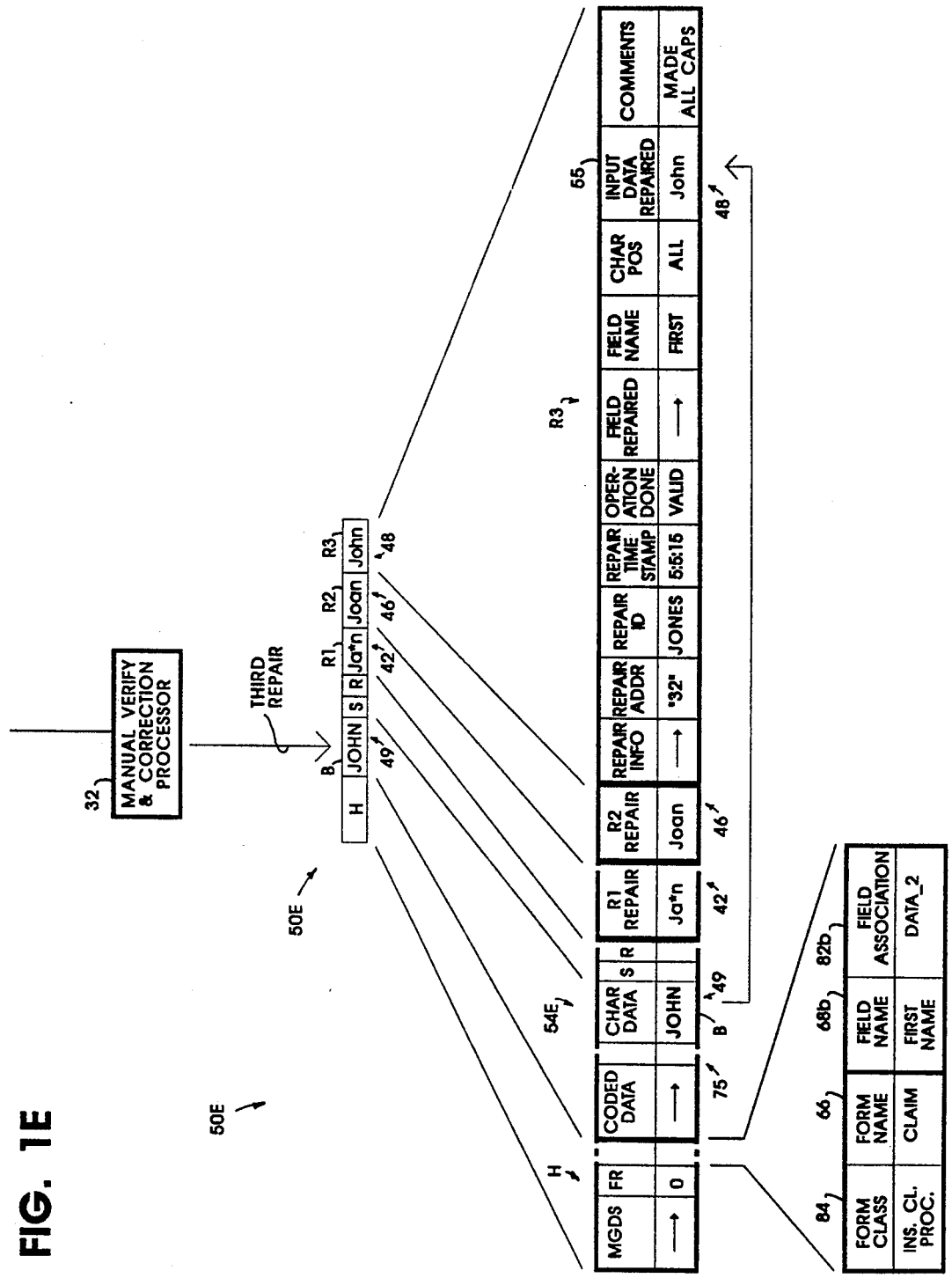
FIG. 1E illustrates the MGDS 50E including the third repair segment R3 output from the manual verify and correction processor 32.
Figure 1F:
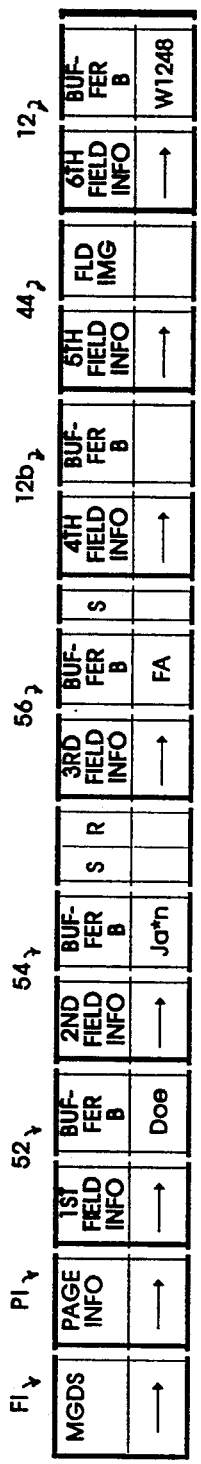
FIG. 1F(B) illustrates the MGDS 50B after the character recognition processor 26 has completed its operations on all six fields of the form.
Figure 1F:
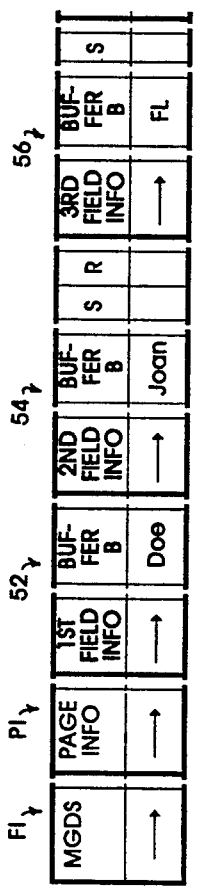
Figure 1F:
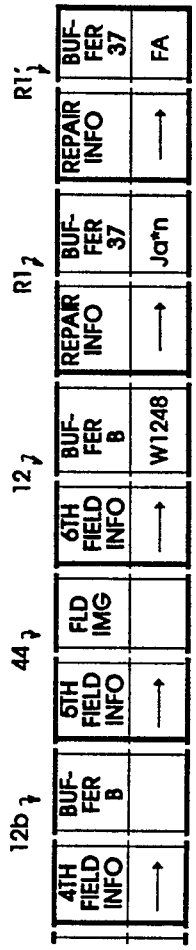
Figure 1F:
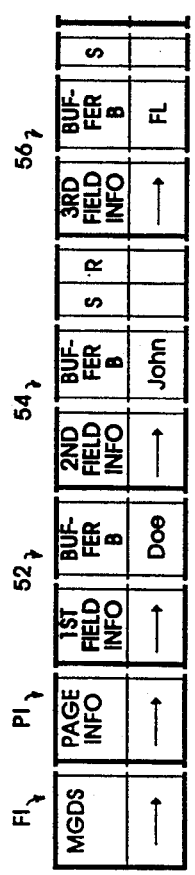
Figure 1F:
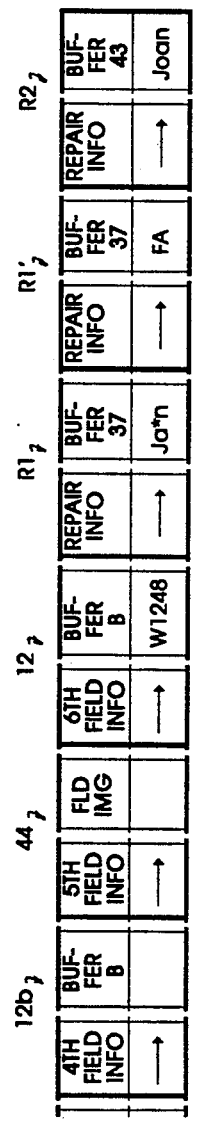
Figure 1F:
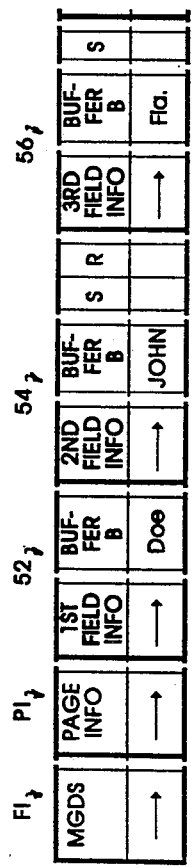
Figure 1F:
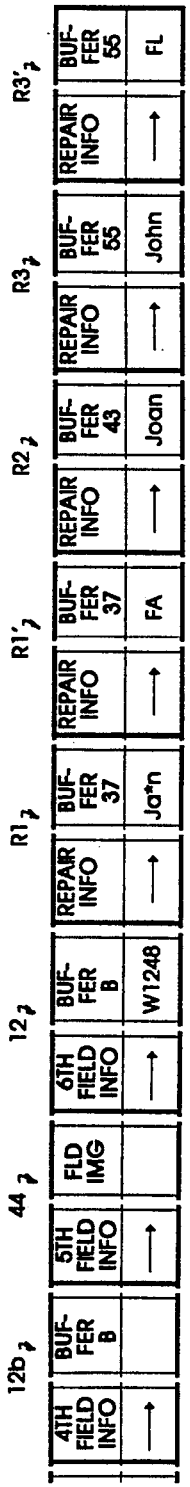
Figure 1G:
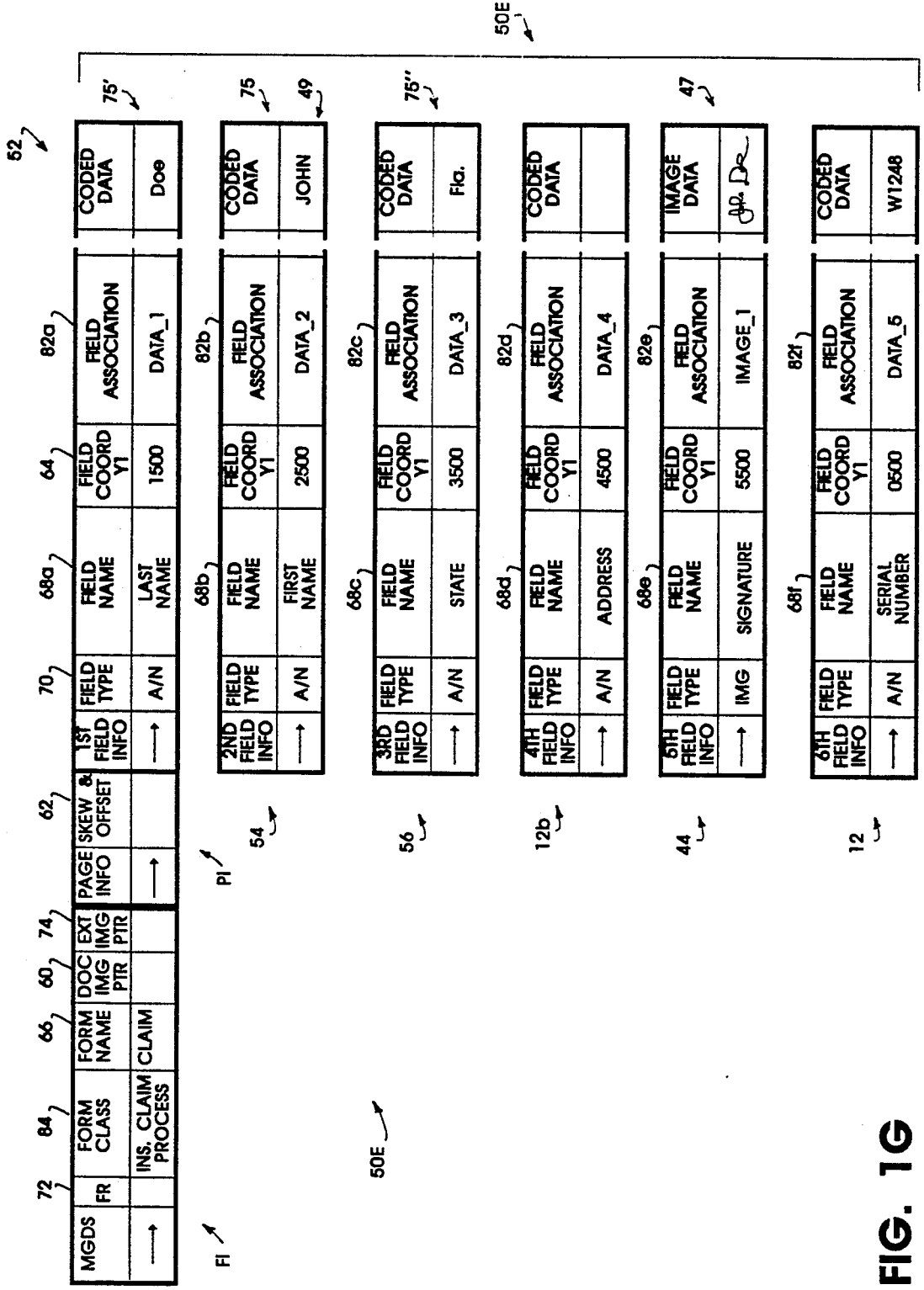
FIG. 1G illustrates the MGDS 50E for the first example form of FIG. 2A.
Figure 1G:
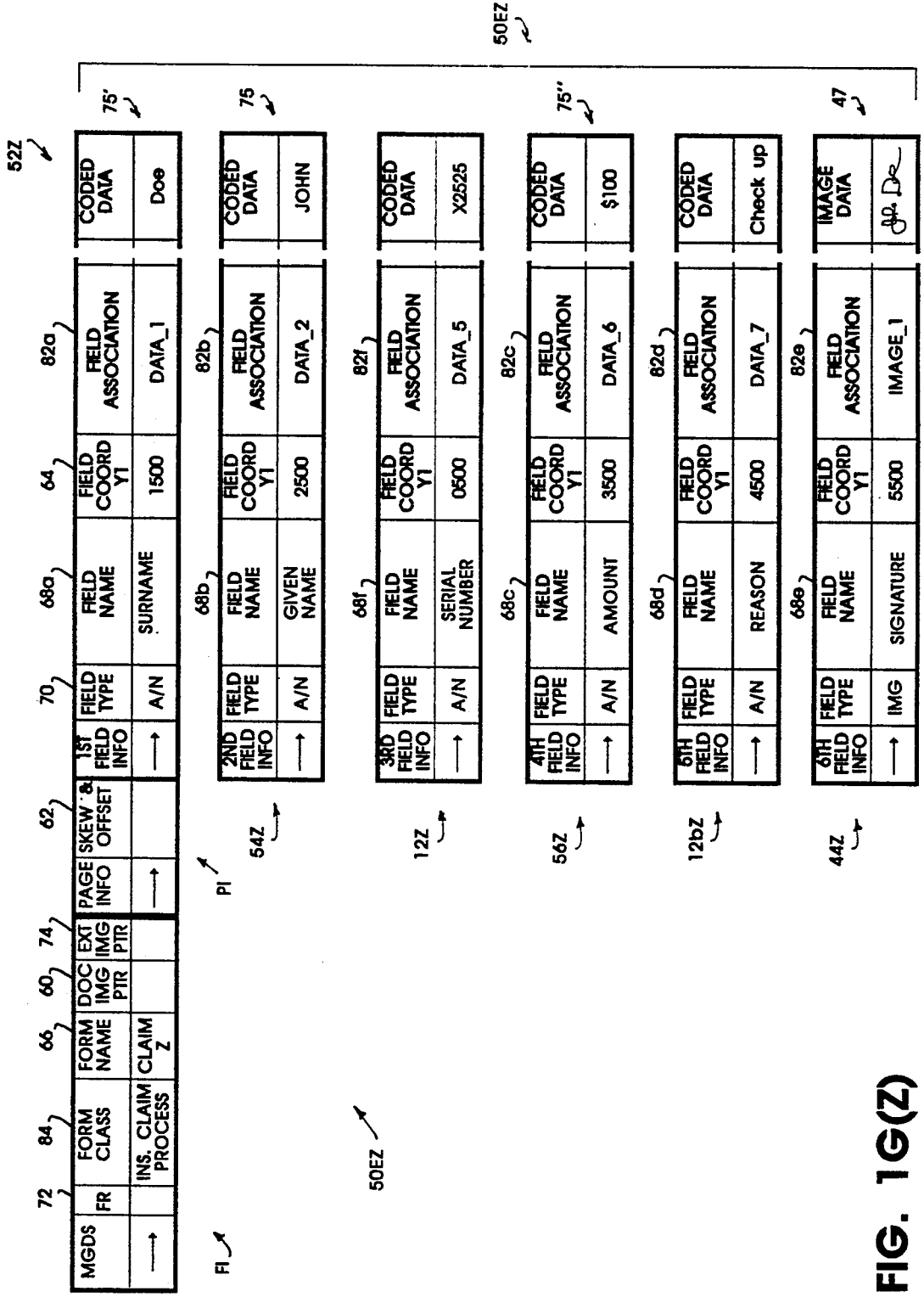

The error correction processor 30 loads the repair address "30" into the segment R2, it loads the repair ID which in this case is data base "DB" into second segment R2, and it loads the repair time stamp of the fifth hour, fourth minute, first second into the repair time stamp parameter of R2. The operation done is loaded as "DATA BASE" into the segment R2 and then their field repaired encompassing parameter in R2 has a field name of "FIRST" loaded therein, the character position of "2" is loaded indicating that the character which is changed is the third character in the string. The data base query can also be entered and is characterized as "customer name" in the segment R2. Also, the level of certainty of 100 percent can be entered into the segment R2. The completed MGDS message 50D output from the data base error correction processor 30 is shown in FIG. 1D.

The MGDS 50D is then transferred to the manual verify and correction processor 32 over the local area network 20.

The manual verify and correction processor 32 will accept the MGDS 50D and will append to it a third repair segment R3. Depending upon the application, a required manual verification can be made on the result of the sequential correction for the character string which has been flagged for the particular field.

The MGDS message 50D output from the data base error correction processor 30 and received by the manual verify and correction processor 32, contains the character data 48 "John" which is to be verified by the operator at the processor 30. The correction processor 32 will append a third repair segment R3 for the third repair stage, whether an actual repair or merely a validation takes place. The repair address "32" and the identity of the operator "Jones" will be entered into the segment R3. Also, the repair time stamp of fifth hour, fifth minute, 15th second, will be entered into the segment R3. The operation done will be indicated as "valid" for validate in segment R3. The coordinates for the character or the entire string as the application may require, are abstracted from the reject character information S originally produced by the character recognition processor 26. These are the coordinates of the location in the image bit map for the field and the reject or suspicious character identified by the character recognition processor 26. The correction processor 32 will use these coordinate values to highlight and/or magnifying the field as it is displayed to the operator. A copy of the document image 10' will be delivered over the LAN 20 to the correction processor 32, for viewing by the operator. The location specified by the coordinates of the rejected or suspicious character are used to highlight and/or magnify that portion of the document image displayed. The operator can then quickly compare the highlighted portion of the document image to the character string 48 "John," which is also displayed in alphanumeric characters on the display screen of the processor 32. If the operator accepts the representation of the string 48 "John," then a validation acceptance is recorded in the segment R3. The validation indication can be entered into the segment R3, for example under the comments portion.

Alternately, if the operator wishes to make a change such as capitalizing all of the characters to change string 48 into string 49 "JOHN," then in accordance with the invention, the string 48 is transferred from the character data buffer B to the input data repair portion 55 of the segment R3. Then the processor 32 loads the corrected value string 49 "JOHN" into the character data buffer B. Other appropriate fields are filled in the segment R3, such as the field name, character position, and comments.

Figure 4C:
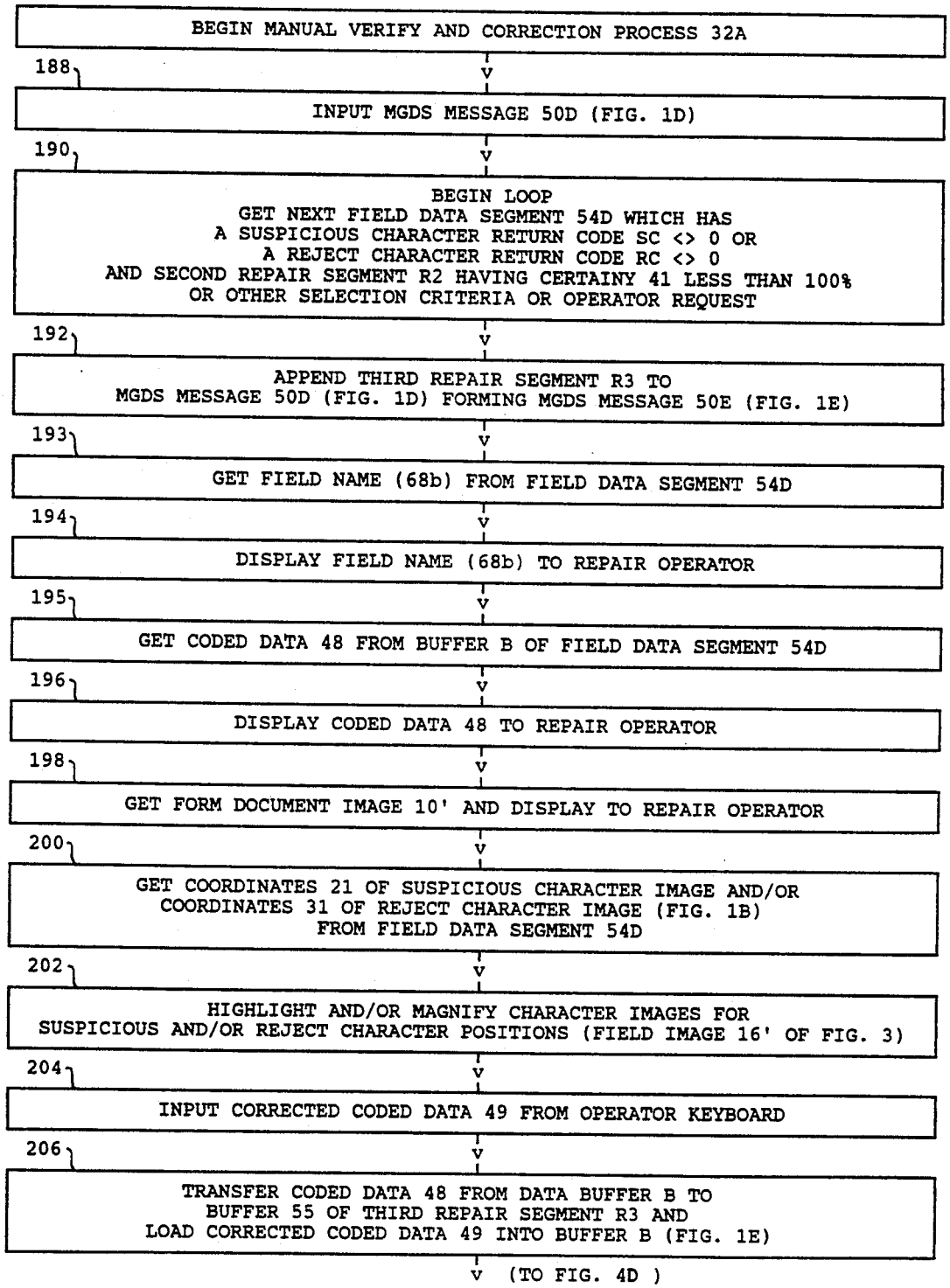

It should be noted in particular in connection with the manual verify and correction process 32A of FIG. 4C, that the field name 68b will be obtained from the field data segment 54D in step 193 and then in step 194, the field name 68b will be displayed to the repair operator. This is in accordance with the invention, which provides the actual name of the field to the operator at any workstation where the coded data in the corresponding field data segment must be examined. This permits a more meaningful display of the coded data, since the operator can correlate the field name displayed on the display device with the image of the field which is also being displayed.

The manual verify and correction processor 32 outputs the MGDS message 50E, shown in FIG. 1F(E). The MGDS message 50E shown in FIG. 1F(E) has six field data segments and five repair segments.

FIG. 1F(E) shows the form of the MGDS 50E which will be output to the host computer 34. The host computer 34 will take the contents of the buffer B for each field data segment for each of the six fields of the form 10' of FIG. 2C, and it will store the contents of each buffer B as the best estimate of the character string which represents the image of the corresponding field in the form. The coded data from field segment 52 for the MGDS 50E is contained in its buffer B as "Doe." This coded data is stored in the coded data storage 35 by the host computer 34, as representing the last name field 16' of the scanned form image 10' in FIG. 2C. Similarly, the buffer B for the field data segment 54 containing the character string "JOHN" will be stored by the host computer 34 in the coded data storage 35 as the best estimate of the character string representing the first name field 16' of the scanned form image 10'. Similarly, the contents of the buffer B for the field data segment 56 which is the character string "Fla." will be stored in the coded data storage 35 by the host computer 34, as the best estimate of the state field 12a' of the scanned form image 10' of FIG. 2C.

At a later time, if the host computer 34 is instructed to conduct an audit as to how the character string in buffer B for a particular field data segment in the MGDS 50E was repaired, the history of repairs for the character recognition of that field can be ascertained by accessing the MGDS 50E from the repair history storage 38. Each respective repair segment corresponding to the field being audited, can be examined to determine how the repair was carried out. For example, for the second field segment 54 which represents the first name field 16', an audit of the character recognition repairs would examine the field data segment 54, the repair segment R3, the repair segment R2, and the repair segment R1, in that sequential order. This would enable working backwards from the final best estimate of the field contained in the field data segment 54 of the MGDS 50E, backward in reverse sequence for the repairs that were executed on that field. If such an audit were conducted in order to improve the overall repair process, a clear indication as to how each stage of the repair was conducted would be revealed from the collective repair history represented by the repair segments in the MGDS 50E.

The resulting MGDS message 50E now contains a history of the sequential repairs performed on the contents of the first name field 16. The MGDS message 50E can then be transmitted over the LAN 20 to the buffer storage 40' for temporary storage. Alternately it can be transferred to the repair history storage 38 for long term storage. Alternately, it can be transferred to the host computer 34 where the contents of the coded data buffer B for the field data segment 54, which is the string 49, can be loaded into the coded data storage 35. The contents can be used for example as an index value where the application uses the insured customer name as the index value to store the document image 10'.

The manual verify and correction processor 32 is shown in a more detailed architectural diagram in FIG. 5B. The processor 32 consists of a memory 402 connected by the bus 422 to CPU 410, a bulk storage device 412, a display and keyboard 414, a LAN adapter 416, and a facsimile and network adapter 420. The LAN adapter 416 connects the LAN 20 to the bus 422. The FAX and network adapter 420 connects a facsimile telephone line to the bus 422 and it connects a data communications network line to the bus 422.

The memory 402 of the processor 32 contains several partitions which include computer programs which are sequences of executable instructions to carry out the processes described above. In particular, the manual verify and correction program 32A' is stored in the memory 402, and when its instructions are executed by the CPU 410, it carries out the manual verify and correction process.

The memory 402 also includes a partition for receiving and storing the MGDS 50D shown in greater detail in FIG. 1D. The memory 402 also has a partition for receiving and storing the form document image 10'.

The memory 402 also has a display buffer partition 424 where the form document image 10' is assembled with a highlighted region 58 which is superimposed on the field image at' at the suspicious character position 21 and the rejected character position 31. This composite image is then displayed to the operator at the processor 32. In addition, the display buffer will assemble the coded data 48 which is "John" so that it may be also displayed to the operator, as previously described. The coded data 48 is obtained from the character data buffer B of the coded data portion 75 of the MGDS 50D. The display buffer 424 in the memory 402 has its contents displayed on a display device 414. The operator will enter the alternate character string 49 which is "JOHN" at the keyboard.

The host computer 34 is shown in greater detail in FIG. 5C. The host computer 34 includes a CPU 510 connected by means of the bus 522 to the memory 502. A document image storage 36 is connected to the bus 522. The coded data storage 35 is connected to the bus 522. A display and keyboard 514 are connected to the bus 522. A local area network adapter 516 connects the LAN 20 to the bus 522. A network adapter 520 connects a data network to the bus 522. Programs stored in the memory 502 have their instructions executed by the CPU 510.

The memory 502 includes a partition for storing the MGDS 50E. Also included in the memory 502 is a partition for storing the first level mapping table 550 and a partition for storing the second level mapping table 552. In addition, a partition is provided for storing the folder application facility program 554 and another partition is provided for storing the insurance claim processing application program 556.

The memory 502 also includes a partition for storing the object distribution manager, the DB2 database manager, the advanced data capture program 85, the object access method program, and the communications manager program. The principles of operation of the Object Distribution Manager and the Object Access Method are described in the U.S. patents to R. E. Probst, et al., cited above. The MVS/ESA operating system 504 is also stored in the memory 502.

In the preferred embodiment, the host computer 34 is an IBM system/390 or other mainframe data processor capable of performing large scale data processing operations. However, it is within the scope of the invention to provide the host computer 34 as a smaller processor, such as an IBM PS/2 Model 80 processor, employing an Intel 80 386 CPU. The intelligent forms processor 25 is a separate processor from the host computer 34, in the preferred embodiment, however it is within the scope of the invention that all of the processing elements shown in FIG. 1 can be contained in a single, high function processor. In another alternate embodiment, the forms definition processor 86 may be a separate processor from the intelligent forms processor 25. This would be the case where forms definition was performed at one workstation in the system and forms receipt and processing for filled out forms was carried out at another workstation in the system shown in FIG. 1.

The resulting advanced data capture architecture invention provides a means to freely generate new document forms which can be automatically processed, even though the order, arrangement, name and number of the fields on the forms are changed.

Although a specific embodiment of the invention has been disclosed, it will be understood by those having skill in the art that changes can be made to that specific embodiment without departing from the spirit and the scope of the invention.

TABLE 1

| FOLDER APPLICATION FACILITY (FAF) PROGRAM 554 | | | |
|---|---|---|---|
| 800 | (A) | | GET PRIMARY_INDEX_VALUE |

TABLE 1-continued

| FOLDER APPLICATION FACILITY (FAF) PROGRAM 554 | | | |
|---|---|---|---|
| 802 | | | GET SECONDARY_INDEX VALUE |
| 804 | | | FORM INDEX RECORD FOR DOCUMENT |
| 806 | | | RETURN |
| 810 | (B) | | ACCESS LIST OF RELATED INDEX RECORDS |
| 812 | | | RETURN |
| 820 | (C) | | GET PRIMARY_ROUTING VALUE |
| 822 | | | ROUTE DOCUMENT TO WORKSTATION |
| 824 | | | RETURN |

TABLE 2

| INSURANCE CLAIM PROC. APPLICATION PROG. 556 | |
|---|---|
| 850 | GET AGENT/EMPLOYER_ID |
| 852 | IF 1ST CHAR = "X", THEN ID = "ZED CORPORATION" |
| 854 | GET INSURED_LAST_NAME |
| 856 | GET INSURED_FIRST_NAME |
| 858 | CALL FAF(B) TO ACCESS EMPLOYEE RECORDS |
| 860 | GET SIGNATURE_BIT_MAP |
| 862 | CALL SIGNATURE VERIFY ROUTINE |
| 864 | GET AMOUNT_CLAIMED |
| 866 | PRINT CHECK |
| 868 | RETURN |
| 870 | GET AGENT/EMPLOYER_ID |
| 872 | IF 1ST CHAR = "W", THEN ID = "AGENT" |
| 874 | CALL FAF(B) TO ACCESS AGENT RECORDS |
| 876 | CALL FAF(C) TO SEND DOCUMENT TO AGENT |
| 878 | RETURN |

What is claimed is:

1. In a data processing system, an advanced data capture method for capturing coded data strings from fields in digital images of document forms, comprising the steps of:

defining a first plurality of program variables for a first application program in said data processing system;

defining a field association list as a plurality of field association names, a first subplurality of which corresponds to said first plurality of program variables;

forming a first mapping table in said data processing system correlating said first subplurality of field association names with said first plurality of program variables;

assembling a document form definition of a document form by selecting a first field association name from said field association list in said data processing system, inputting a first field name and associating said first field association name and said first field name in a first field data segment for a first field of said document form;

inputting a digital image of said document form, performing a character recognition operation on said first field, deriving first recognition coded data from said first field and transferring it to said first data segment;

forming a data structure including said first field data segment;

extracting said first field association name from said first data segment of said data structure in said data processing system and using it to look up a corresponding first program variable in said first mapping table;

setting said first program variable equal to said first recognition coded data in said first field data segment in said data processing system;

running said first application program using said first recognition coded data.

2. The method of claim 1, wherein said step of inputting a digital image further comprises:
accessing a digital image of said document form stored in a storage device coupled to said data processing system.

3. The method of claim 1, wherein said step of inputting a digital image further comprises:
receiving a digital image of said document form transmitted from a second data processing system coupled to said data processing system.

4. The method of claim 1, wherein said step of inputting a digital image further comprises:
receiving a facsimile image of said document form from a facsimile receiving device coupled to said data processing system.

5. The method of claim 1, which further comprises:
said step of assembling a document form definition of a document form is performed at a first processor in said data processing system;
said step of deriving first recognition coded data from said form is performed at a second processor in said data processing system; and
said step of setting said first program variable equal to said first recognition coded data is performed at a third processor in said data processing system.

6. The method of claim 1, which further comprises:
said step of assembling a document form definition of a document form is performed at a first processor in said data processing system;
said step of deriving first recognition coded data from said form is performed at said first processor in said data processing system; and
said step of setting said first program variable equal to said first recognition coded data is performed at a second processor in said data processing system.

7. The method of claim 1, which further comprises:
said step of assembling a document form definition of a document form is performed at a first processor in said data processing system;
said step of deriving first recognition coded data from said form is performed at said first processor in said data processing system; and
said step of setting said first program variable equal to said first recognition coded data is performed at said first processor in said data processing system.

8. In a data processing system, an advanced data capture method for capturing coded data strings from fields in digital images of document forms, comprising the steps of:
defining a first plurality of program variables for a first application program in said data processing system, said first program providing an operating environment for other application programs;
defining a second plurality of program variables for a second application program in said data processing system, said second program operating using said operating environment provided by said first application program;
defining a field association list as a plurality of field association names, a first subplurality of which corresponds to said first plurality of program variables and a second subplurality of which corresponds to said second plurality of program variables;
forming a first mapping table in said data processing system correlating said first subplurality of field association names with said first plurality of program variables;
forming a second mapping table in said data processing system correlating said second subplurality of field association names with said second plurality of program variables;
assembling a document form definition of a document form by selecting a first field association name from said field association list in said data processing system, inputting a first field name and associating said first field association name and said first field name in a first field data segment for a first field of said document form;
further assembling said document form definition by selecting a second field association name from said field association list in said data processing system, inputting a second field name and associating said second field association name and said second field name in a second field data segment for a second field of said document form;
inputting a digital image of said document form, performing a character recognition operation on said first field, deriving first recognition coded data from said first field and transferring it to said first data segment;
performing a character recognition operation on said second field, deriving second recognition coded data from said second field and transferring it to said second data segment;
forming a data structure including said first and said second field data segments;
extracting said first field association name from said first data segment of said data structure in said data processing system and using it to look up a corresponding first program variable in said first mapping table;
setting said first program variable equal to said first recognition coded data in said first field data segment in said data processing system, and running said first application program using said first recognition coded data;
extracting said second field association name from said second data segment of said data structure in said data processing system and using it to look up a corresponding second program variable in said second mapping table;
setting said second program variable equal to said second recognition coded data in said second field data segment in said data processing system, and running said second application program using said second recognition coded data.

9. The method of claim 8, which further comprises:
said first application program being an object index management program;
said first application program forming an index value for said document form using said first recognition coded data, said index value relating said document form to related objects stored in said data processing system;
calling said first application program with said second application program, to provide identity information for said related objects using said index value;
running said second application program using said identity information provided by said first application program.

10. The method of claim 8, which further comprises:
said first application program being an object routing management program;

said first application program forming a routing value for said document form using said first recognition coded data, said routing value identifying a data communication route in said data processing system;

calling said first application program with said second application program, to provide routing information for said document form;

running said second application program using said routing information provided by said first application program.

11. The method of claim 8, which further comprises:

said first application program being an object storage management program;

said first application program forming a storage value for said document form using said first recognition coded data, said storage value relating said document form to a data storage device in said data processing system;

calling said first application program with said second application program, to provide storage information for said document form;

running said second application program using said storage information provided by said first application program.

12. In a data processing system, an advanced data capture method for capturing coded data strings from fields in digital images of document forms, comprising the steps of:

defining a first plurality of program variables for a first application program in a first data processor;

defining a field association list as a plurality of field association names, a first subplurality of which corresponds to said first plurality of program variables;

forming a first mapping table in said first data processor correlating said first subplurality of field association names with said first plurality of program variables;

accessing said field association list and storing it in a second data processor coupled to said first data processor;

assembling a document form definition of a document form by selecting a first field association name from said field association list at said second data processor, inputting a first field name and associating said first field association name and said first field name in a first field data segment for a first field of said document form;

inputting a digital image of said document form, performing a character recognition operation on said first field, deriving first recognition coded data from said first field and transferring it to said first data segment;

forming a data structure including said first field data segment and transmitting said data structure to said first data processor;

extracting said first field association name from said first data segment of said data structure at said first data processor and using it to look up a corresponding first program variable in said first mapping table;

setting said first program variable equal to said first recognition coded data in said first field data segment at said first processor;

running said first application program using said first recognition coded data.

13. In a data processing system, an advanced data capture method for capturing coded data strings from fields in digital images of document forms, comprising the steps of:

defining a first plurality of program variables for a first application program in a first data processor, said first program providing an operating environment for other application programs;

defining a second plurality of program variables for a second application program in said first data processor, said second program operating using said operating environment provided by said first application program;

defining a field association list as a plurality of field association names, a first subplurality of which corresponds to said first plurality of program variables and a second subplurality of which corresponds to said second plurality of program variables;

forming a first mapping table in said first data processor correlating said first subplurality of field association names with said first plurality of program variables;

forming a second mapping table in said first data processor correlating said second subplurality of field association names with said second plurality of program variables;

accessing said field association list and storing it in a second data processor coupled to said first data processor;

assembling a document form definition of a document form by selecting a first field association name from said field association list at said second data processor, inputting a first field name and associating said first field association name and said first field name in a first field data segment for a first field of said document form;

further assembling said document form definition by selecting a second field association name from said field association list at said second data processor, inputting a second field name and associating said second field association name and said second field name in a second field data segment for a second-field of said document form;

inputting a digital image of said document form, performing a character recognition operation on said first field, deriving first recognition coded data from said first field and transferring it to said first data segment;

performing a character recognition operation on said second field, deriving second recognition coded data from said second field and transferring it to said second data segment;

forming a data structure including said first and said second field data segments and transmitting said data structure to said first data processor;

extracting said first field association name from said first data segment of said data structure at said first data processor and using it to look up a corresponding first program variable in said first mapping table;

setting said first program variable equal to said first recognition coded data in said first field data segment at said first processor, and running said first application program using said first recognition coded data;

extracting said second field association name from said second data segment of said data structure at said first data processor and using it to look up a corresponding second program variable in said second mapping table;

setting said second program variable equal to said second recognition coded data in said second field data segment at said first processor, and running said second application program using second recognition coded data.

14. In a data processing system, an advanced data capture method for capturing coded data strings from fields in digital images of document forms, comprising the steps of:

defining a first plurality of program variables for a first application program in a first data processor;

defining a field association list as a plurality of field association names, a first subplurality of which corresponds to said first plurality of program variables;

forming a first mapping table in said first data processor correlating said first subplurality of field association names with said first plurality of program variables;

accessing said field association list and storing it in a second data processor coupled to said first data processor;

assembling a document form definition of a document form by selecting a first field association name from said field association list at said second data processor, inputting a first field name and associating said first field association name and said first field name in a first field data segment for a first field of said document form;

further assembling said document form definition by selecting a second field association name from said field association list at said second data processor, inputting a second field name and associating said second field association name and said second field name in a second field data segment for a second field of said document form;

inputting a digital image of said document form, performing a character recognition operation on said first field, deriving first recognition coded data from said first field and transferring it to said first data segment;

performing a character recognition operation on said second field, deriving second recognition coded data from said second field and transferring it to said second data segment;

forming a data structure including said first and said second field data segments and transmitting said data structure to said first data processor;

extracting said first field association name from said first data segment of said data structure at said first data processor and using it to look up a corresponding first program variable in said first mapping table;

setting said first program variable equal to said first recognition coded data in said first field data segment at said first processor;

extracting said second field association name from said second data segment of said data structure at said first data processor and using it to look up a corresponding second program variable in said first mapping table;

setting said second program variable equal to said second recognition coded data in said second field data segment at said first processor;

running said first application program using said first recognition coded data and said second recognition coded data.

15. In a data processing system, an advanced data capture method for capturing coded data strings from fields in digital images of document forms, the method comprising the steps of:

defining a first plurality of program variables for a first application program in said data processing system;

defining a field association list as a plurality of field association names, a first subplurality of which corresponds to said first plurality of program variables;

forming a first mapping table in said data processing system correlating said first subplurality of field association names with said first plurality of program variables;

assembling a document form definition of a document form by selecting a first field association name from said field association list in said data processing system, inputting a first field name and association said first field association name and said first field name in a first field data segment for a first field of said document form;

inputting a digital image of said document form, performing a character recognition operation on said first field, deriving first recognition coded data from said first field and transferring it to said first data segment;

forming a data structure including said first field data segment;

extracting said first field association name from said first data segment of said data structure in said data processing system and using it to look up a corresponding first program variable in said first mapping table;

setting said first program variable equal to said first recognition coded data in said first field data segment in said data processing system;

running said first application program using said first recognition coded data.

16. A data processing system for capturing coded data strings from fields in digital images of document forms, comprising:

a first data processor in said system, for defining a first plurality of program variables for a first application program;

said first data processor defining a field association list as a plurality of field association names, a first subplurality of which corresponds to said first plurality of program variables;

said first data processor forming a first mapping table correlating said first subplurality of field association names with said first plurality of program variables;

a second data processor in said system, coupled to said first data processor, for accessing said field association list;

said second data processor assembling a document form definition of a document form by selecting a first field association name from said field association list, inputting a first field name and associating said first field association name and said first field name in a first field data segment for a first field of said document form;

said second data processor inputting a digital image of said document form, performing a character recognition operation on said first field, deriving first recognition coded data from said first field and transferring it to said first data segment;

said second data processor forming a data structure including said first field data segment and transmitting said data structure to said first data processor;

said first data processor extracting said first field association name from said first data segment of said data structure and using it to look up a corresponding first program variable in said first mapping table;

said first data processor setting said first program variable equal to said first recognition coded data in said first field data segment;

said first data processor running said first application program using said first recognition coded data.

17. The system of claim 16, which further comprises:
storage device coupled to said data processing system, for storing a digital image of said document form;
accessing means in said second data processor, for accessing said digital image of said document form stored in said storage device.

18. The system of claim 16, which further comprises:
receiving means in said second data processor, for receiving a digital image of said document form transmitted from a second data processing system coupled to said data processing system.

19. The system of claim 16, which further comprises:
receiving means in said second data processor, for receiving a facsimile image of said document form from a facsimile receiving device coupled to said data processing system.

20. The system of claim 16, which further comprises:
a third data processor in said system, coupled to said second data processor, for displaying said first recognition coded data;
said third data processor receiving said data structure from said second data processor, extracting said first field name from said first data segment of said data structure and displaying said first field name with said first recognition coded data.

21. A data processing system for capturing coded data strings from fields in digital images of document forms, comprising:
a first data processor in said system, for defining a first plurality of program variables for a first application program;
said first data processor defining a field association list as a plurality of field association names, a first subplurality of which corresponds to said first plurality of program variables;
said first data processor forming a first mapping table correlating said first subplurality of field association names with said first plurality of program variables;
a second data processor in said system, coupled to said first data processor, for accessing said field association list;
said second data processor assembling a document form definition of a document form by selecting a first field association name from said field association list, inputting a first field name and associating said first field association name and said first field name in a first field data segment for a first field of said document form;
said second data processor inputting a digital image of said document form, performing a character recognition operation on said first field, deriving first recognition coded data from said first field and transferring it to said first data segment;

said second data processor forming a data structure including said first field data segment;
a third data processor in said system, coupled to said second data processor, for displaying said first recognition coded data for verification and error correction;
said third data processor receiving said data structure from said second data processor, extracting said first field name from said first data segment of said data structure and displaying said first field name and said first recognition coded data
said third data processor performing error correction on said first recognition coded data, producing first repaired coded data and transferring said first repaired coded data to said first field data segment of said data structure, forming a repaired data structure;
said first processor in said system, coupled to said third data processor, for receiving said repaired data structure;
said first data processor extracting said first field association name from said first data segment of said repaired data structure and using it to look up a corresponding first program variable in said first mapping table;
said first data processor setting said first program variable equal to said first repaired coded data in said first field data segment;
said first data processor running said first application program using said first repaired coded data.

22. The system of claim 21, which further comprises:
storage device coupled to said data processing system, for storing a digital image of said document form;
accessing means in said second data processor, for accessing said digital image of said document form stored in said storage device.

23. The system of claim 21, which further comprises:
receiving means in said second data processor, for receiving a digital image of said document form transmitted from a second data processing system coupled to said data processing system.

24. The system of claim 21, which further comprises:
receiving means in said second data processor, for receiving a facsimile image of said document form from a facsimile receiving device coupled to said data processing system.

25. The system of claim 21, which further comprises:
said first application program being an object index management program;
said first application program forming an index value for said document form using said first repaired coded data, said index value relating said document form to related objects stored in said data processing system.

26. The system of claim 21, which further comprises:
said first application program being an object routing management program;
said first application program forming a routing value for said document form using said first repaired coded data, said routing value identifying a data communication route in said data processing system.

27. The system of claim 21, which further comprises:
said first application program being an object storage management program;
said first application program forming a storage value for said document form using said first repaired coded data, said storage value relating said document form to a data storage device in said data processing system.

* * * * *